(12) United States Patent
Chang et al.

(10) Patent No.: US 7,254,668 B1
(45) Date of Patent: Aug. 7, 2007

(54) METHOD AND APPARATUS FOR GROUPING PAGES WITHIN A BLOCK

(75) Inventors: Robert C. Chang, Danville, CA (US); Bahman Qawami, San Jose, CA (US); Farshid Sabet-Sharghi, San Jose, CA (US)

(73) Assignee: SanDisk Corporation, Milpitas, CA (US)

( * ) Notice: Subject to any disclaimer, the term of this patent is extended or adjusted under 35 U.S.C. 154(b) by 387 days.

(21) Appl. No.: 10/281,855

(22) Filed: Oct. 28, 2002

(51) Int. Cl.
*G06F 12/00* (2006.01)
(52) U.S. Cl. .................. 711/103; 711/100; 711/101; 711/102; 711/154; 711/170; 711/202; 711/203; 365/94; 365/189.01
(58) Field of Classification Search ........... 711/103, 711/156, 159, 170, 202, 100, 101, 102, 154, 711/203; 365/185.11, 238.5, 94, 189.01
See application file for complete search history.

(56) References Cited

U.S. PATENT DOCUMENTS

| 5,095,420 A | 3/1992 | Eilert et al. |
| 5,222,109 A | 6/1993 | Pricer ........................ 377/24.1 |
| 5,297,148 A | 3/1994 | Harari et al. ............. 371/10.2 |
| 5,341,339 A | 8/1994 | Wells |
| 5,375,214 A | 12/1994 | Mirza et al. |
| 5,388,083 A | 2/1995 | Assar et al. ................. 365/218 |
| 5,404,485 A | 4/1995 | Ban |
| 5,438,573 A | 8/1995 | Mangan et al. ............ 371/10.3 |
| 5,561,778 A | 10/1996 | Fecteau et al. |
| 5,568,439 A | 10/1996 | Harari ........................ 365/218 |
| 5,579,499 A | 11/1996 | Fecteau et al. |
| 5,594,881 A | 1/1997 | Fecteau et al. |
| 5,598,370 A | 1/1997 | Niijima et al. ......... 365/185.33 |
| 5,734,816 A * | 3/1998 | Niijima et al. ................. 714/8 |

(Continued)

FOREIGN PATENT DOCUMENTS

JP 62-283496 12/1987

(Continued)

OTHER PUBLICATIONS

Kim, Jesung et al., "A Space-Efficient Flash Translation Layer for Compactflash Systems", IEEE Transactions on Consumer Electronics, vol. 48, No. 2, May 2002.

(Continued)

*Primary Examiner*—Stephen C. Elmore
*Assistant Examiner*—Daniel Kim
(74) *Attorney, Agent, or Firm*—Anderson, Levine & Lintel

(57) ABSTRACT

Methods and apparatus for efficiently enabling pages within a block to be accessed are disclosed. According to one aspect of the present invention, a method for writing data into a first block in a non-volatile memory which includes pages that are grouped into groups which each include two or more pages involves determining when a first group is available to receive the data. When it is determined that the first group is available to receive the data, the data is written into a first page included in the first group. The method also includes determining when a second group is available to receive the data if it is determined that the first group is not available to receive the data, and writing the data into a second page included in the second group when it is determined that the second group is available to receive the data.

41 Claims, 15 Drawing Sheets

U.S. PATENT DOCUMENTS

| | | | |
|---|---|---|---|
| 5,835,935 A | 11/1998 | Estakhri et al. | 711/103 |
| 5,845,313 A | 12/1998 | Estakhri et al. | 711/103 |
| 5,860,082 A | 1/1999 | Smith et al. | 711/103 |
| 5,907,856 A | 5/1999 | Estakhri et al. | 711/103 |
| 5,924,113 A | 7/1999 | Estakhri et al. | 711/103 |
| 5,930,193 A * | 7/1999 | Achiwa et al. | 365/230.03 |
| 5,937,425 A * | 8/1999 | Ban | 711/103 |
| 5,987,573 A * | 11/1999 | Hiraka | 711/156 |
| 6,016,275 A | 1/2000 | Han | 365/185.29 |
| 6,081,447 A | 6/2000 | Lofgren et al. | 365/185.02 |
| 6,115,785 A | 9/2000 | Estakhri et al. | 711/103 |
| 6,125,435 A | 9/2000 | Estakhri et al. | 711/201 |
| 6,139,177 A * | 10/2000 | Venkatraman et al. | 700/83 |
| 6,230,233 B1 | 5/2001 | Lofgren et al. | 711/103 |
| 6,260,156 B1 | 7/2001 | Garvin et al. | 714/8 |
| 6,426,893 B1 | 7/2002 | Conley et al. | 365/185.11 |
| 6,684,289 B1 * | 1/2004 | Gonzalez et al. | 711/103 |
| 6,772,274 B1 | 8/2004 | Estakhri | |
| 6,807,095 B2 * | 10/2004 | Chen et al. | 365/185.02 |
| 6,813,678 B1 * | 11/2004 | Sinclair et al. | 711/103 |
| 6,823,526 B2 * | 11/2004 | Howard et al. | 719/327 |
| 2002/0099904 A1 * | 7/2002 | Conley | 711/103 |

FOREIGN PATENT DOCUMENTS

| | | |
|---|---|---|
| JP | 62-283497 | 12/1987 |

OTHER PUBLICATIONS

Chiang et al., "Managing flash memory in personal communications devices", Proceedings of 1997 IEEE International Symposium on Consumer Electronics, pp. 177-82.

Kawaguchi et al., "Flash-Memory Based File System", Proceedings of the USENIX Annual Technical Conference (1995), pp. 155-164.

* cited by examiner

METHOD AND APPARATUS FOR GROUPING PAGES WITHIN A BLOCK

CROSS REFERENCE TO RELATED APPLICATIONS

The present invention is related to co-pending U.S. patent application Ser. No. 10/281,739 entitled "WEAR LEVELING IN NON-VOLATILE STORAGE SYSTEMS", filed Oct. 28, 2002; co-pending U.S. patent application Ser. No. 10/281,670 entitled "TRACKING THE MOST FREQUENTLY ERASED BLOCKS IN NON-VOLATILE MEMORY SYSTEMS", filed Oct. 28, 2002: co-pending U.S. patent application Ser. No. 10/281,824 entitled "TRACKING THE LEAST FREQUENTLY ERASED BLOCKS IN NON-VOLATILE MEMORY SYSTEMS", filed Oct. 28, 2002; co-pending U.S. patent application Ser. No. 10/281,631 entitled "METHOD AND APPRATUS FOR SPLITTING A LOGIC BLOCK", filed Oct. 28, 2002: co-pending U.S. patent application Ser. No. 10/281,762 entitled "METHOD AND APPARATUS FOR RESOLVING PHYSICAL BLOCKS ASSOCIATED WITH A COMMON LOGICAL BLOCK," filed Oct. 28, 2002: co-pending U.S. patent application Ser. No. 10/281,696 entitled "MAINTAINING ERASE COUNTS IN NON-VOLATILE STORAGE SYSTEMS", filed Oct. 28, 2002 and now issued as U.S. Pat. No. 6,831,865; co-pending U.S. patent application Ser. No. 10/281,626 entitled "METHOD AND APPARATUS FOR MANAGING AN ERASE COUNT BLOCK", filed Oct. 28, 2002; and co-pending U.S. patent application Ser. No. 10/281,804 entitled "METHOD AND APPARATUS FOR PERFORMING MULTI-PAGE READ AND WRITE OPERATIONS IN A NON-VOLATILE MEMORY," filed Oct. 28, 2002; which are each incorporated herein by reference in their entireties.

BACKGROUND OF THE INVENTION

1. Field of Invention

The present invention relates generally to mass digital data storage systems. More particularly, the present invention relates to systems and methods for efficiently writing to a block of flash memory.

2. Description of the Related Art

The use of non-volatile memory systems such as flash memory storage systems is increasing due to the compact physical size of such memory systems, and the ability for non-volatile memory to be repetitively reprogrammed. The compact physical size of flash memory storage systems facilitates the use of such storage systems in devices which are becoming increasingly prevalent. Devices which use flash memory storage systems include, but are not limited to, digital cameras, digital camcorders, digital music players, handheld personal computers, and global positioning devices. The ability to repetitively reprogram non-volatile memory included in flash memory storage systems enables flash memory storage systems to be used and reused.

In general, flash memory storage systems may include flash memory cards and flash memory chip sets. Flash memory chip sets generally include flash memory components and a controller components. Typically, a flash memory chip set may be arranged to be assembled into an embedded system. The manufacturers of such assemblies or host systems typically acquire flash memory in component-form, as well as other components, then assemble the flash memory and the other components into a host system.

As shown in FIG. 1a, within a file system, memory 10 is effectively divided into a system or directory area 12 and a data area 14. System area 12 generally includes root directories and file allocation tables (FATs), while data files are typically included in data area 14. A file system may write data in sectors, e.g., one page at a time, into system area 12, while writing data in clusters, e.g., multiple pages at a time, into data area 14. The size of each cluster, which is generally the minimum size of a file that is associated with data area 14, may vary. For example, in an overall system which is running either a Windows or a DOS system, a cluster may be sized to include approximately four to approximately 256 pages.

Any updates associated with a logical block, or a block that is associated with a file system, are effectively propagated to the flash media where a physical block is mapped to the logical block. FIG. 1b is a diagrammatic representation of a mapping between a logical block and a physical block of a flash media. A logical block 52 includes a plurality of pages which are each mapped to pages of a physical block 54 such that when a page associated with logical block 52 is updated, the update is written into physical block 54.

When a page, e.g., a logical page, is updated, a physical block with which the page is associated is written to. Conventionally, a block may be written to in a "fixed" manner or in a "random" manner. When a block is written to in a fixed manner, a page is written into a block at a corresponding page offset. As shown in FIG. 2a, when a logical block page 214 is updated, contents associated with the logical block page 214 are generally written into a corresponding page 218 within a physical block 210. For example, when logical block page 214 corresponds to physical block page 218h, and physical block page 218h is available, the contents of logical block page 214 may be written into physical block page 218h. When physical block page 218h is available, the indication is that there have effectively been no pages 218 written in block 210 that have a higher page number than physical block page 218h.

In the event that there have been pages 218 written in block 210 that have a higher page number than a logical block page with contents which are to be written, then when block 210 is arranged to be written to in a fixed manner, the contents of the logical block page may not be written into block 210. To write a lower page number after the higher page has been written into the flash memory is an "out-of-sequence" write operation. As will be understood by those skilled in the art, some flash media do not allow for this type of operation. Therefore, the contents of the logical block page as well as contents of pages 218 are written into a new block. FIG. 2b is a diagrammatic representation of an old block, e.g., block 210 of FIG. 2a, and a new block which is arranged to accommodate the contents of the old block. When contents of a logical block page 234 are to be written into a physical block in a fixed manner, it is determined whether block 210, i.e., a current block, may be written into. If logical page 234 has a lower page number than is available in block 210, then the contents of logical page 234 may not be written into block 210. In other words, if a physical page 218 with a corresponding page offset to logical block 234 is not available, e.g., has already been written to, then a new physical page 230 generally must be obtained to enable the contents of logical page 234 to be written.

Since logical block 234 corresponded to page 218c of physical block 210, when block 230 is obtained, the contents of pages 218 are generally copied into corresponding pages 238 of physical block 230, except for the contents of page 218c. Instead of copying the contents of page 218c into page 238c, the contents of logical block 234 are copied into page 238c. Hence, after a copy or write operation, page 238a, page 238b, and pages 238d-238g contain the contents of page 218a, page 218b, and pages 218d-g, respectively, while page 238c contains the contents associated with logical page 234. Once block 230 has been written to, then block 210 may be erased.

Writing to a block in a fixed manner is generally efficient when a page with a corresponding page offset is available within the block for a page that is being written. However, when a page with a corresponding page offset is not available to be written into, then even if there are available pages within the block, a new block generally must be obtained to enable the write operation to be completed. Obtaining a new block consumes a significant amount of computational overhead, copy operations which copy contents into the new block and erase operations which erase an old block typically must be run. As will appreciated by those skilled in the art, such operations, particularly write and erase operations, are relatively expensive.

In lieu of a fixed manner or writing to a block, a random manner may instead be implemented to write data to a block. Contents associated with substantially any logical page may be written into the next available page space in a block when blocks are written to in a random manner. With reference to FIG. 3, a random manner of writing data to a block will be described. When contents of a logical block page 314 are to be written into a physical block 310 and there are available pages 318 within block 310, then the contents of logical block page 314 may be written into the next sequential available page 318. For example, the contents of logical page 314a may be written into page 318h, while the contents of logical page 314b may be written into page 318i.

It should be appreciated that although logical page 314b may correspond to page 318c, updated contents of logical page 314b may be written into page 318i if page 318i is the next available page in block 310. When logical page 314 is essentially to be read, then it is generally necessary to identify page 318i within block 310 as containing the latest contents associated with logical page 314b. As shown, when page 318i is the last page in block 310, identifying page 318i as containing contents associated with logical page 314b may require reading all of block 310 and, hence, may require a relatively high number of read operations. Reading through substantially all of block 310 in order to access contents associated with logical page 314b may be relatively time-consuming. Although there are techniques which use overall system memory or flash memory for caching information relating to pages 318 and contents of pages 318 such that the number of read operations needed to locate and access contents associated with logical pages such as logical pages 314 may be reduced, such techniques increase memory requirements of the overall system or, more specifically, software executing within the overall system.

Therefore, what are desired are a hybrid method and an apparatus for efficiently enabling pages associated with physical blocks to be written and to be accessed. That is, what is needed is a hybrid system which utilizes both fixed and random processes to enable pages within a block to be efficiently written to and easily accessed, substantially without requiring relatively frequent block erasures or a relatively large number of read operations.

SUMMARY OF THE INVENTION

The present invention relates to a system and a method for efficiently enabling pages within a block to be accessed. According to one aspect of the present invention, a method for writing data into a first block in a non-volatile memory which includes a plurality of pages that are grouped into a plurality of groups which each include two or more pages involves determining when a first group of the plurality of groups is available to receive the data. When it is determined that the first group is available to receive the data, the data is written into a first page included in the first group. The method also includes determining when a second group of the plurality of groups is available to receive the data if it is determined that the first group is not available to receive the data, and writing the data into a second page included in the second group when it is determined that the second group is available to receive the data.

In one embodiment, the method also includes determining when a second block is available to receive the data if it is determined that the second group is not available to receive the data. In another embodiment, the data is associated with a logical page, and the first block is a first physical block.

Grouping pages within blocks such that a group of pages within a physical block may be obtained in lieu of new physical block when a page is to be written enables the overall efficiency associated with writing pages to be improved. In other words, the likelihood that a new block will have to be obtained in order to enable data to be written may be reduced because of the possibility that a group within the new block may be available. As such, a write process may occur more efficiently, at least in part because the occurrences of erase processes, e.g., an erase processes which are used to erase old blocks once new blocks are obtained, may be significantly reduced. In addition, a read process to read a set of data stored in a particular page may occur more efficiently, as groups may be perused in an attempt to identify the particular page in lieu of reading an entire block to locate the particular page. For example, if a group of pages is determined to not include the particular page, the pages of the group need not be individually read, i.e., substantially only the pages of the group which includes the particular page may need to be read. By applying a group concept, a read operation is faster than it would be when read operations occur in an effectively random manner, because substantially only the pages of the identical group need to be checked. A write operation which is associated with a group concept is faster than a conventional fixed process, because there are more locations for the page to be written in a single physical block. Thus, there is a reduction in the need to allocate a new block and to erase the old block.

According to another aspect of the present invention, a memory block that is a part of a non-volatile memory includes a plurality of pages which are divided into at least a first set of pages and a second set of pages. The memory block also includes a first group. The first group includes the first set of pages, and has a first group identifier which identifies the first group and is stored in the first group. Additionally, the memory block also includes a second group which includes the second set of pages and has a second group identifier which identifies the second group. The second group identifier is stored in the second group. In one embodiment, an order of the pages included in the first set of pages is substantially fixed relative to a beginning of the first group and an order of the pages included in the second set of pages is substantially fixed relative to a beginning of the second group.

According to yet another aspect of the present invention, a method for writing data into a first physical block in a non-volatile memory which includes a plurality of physical pages grouped into a plurality of physical groups of two or more physical pages involves identifying a first set of data associated with a first logical page determining when a first physical group of the plurality of physical groups is associated with the first logical group. The first logical page is one of a plurality of logical pages included in a first logical group of a logical block. The method also includes determining when a first physical page included in the first physical group is available to accommodate the first set of data if it is determined that the first physical group is associated with the first logical group, and writing the first set of data into the first physical page when it is determined that the first physical page is available to accommodate the first set of data.

In one embodiment, the method for writing data into a first physical block also includes determining when a second physical group included in the plurality of physical groups is available if it is determined that the first physical page is not available to accommodate the first set of data, and writing the first set of data into a second physical page associated with the second physical group. In such an embodiment, the method may further include determining when a second physical block associated with the non-volatile memory is available to accommodate the first set of data when it is determined that the second physical group is not available.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 4b is a diagrammatic representation a memory device, e.g., memory device 120 of FIG. 4a.

DETAILED DESCRIPTION OF THE EMBODIMENTS

Reducing the overall amount of overhead and time that is needed to store or otherwise rewrite updated pages may enable an overall system, e.g., an overall host system with an embedded non-volatile memory chip, to operate more efficiently. Obtaining a new physical block each time a page associated with the physical block is to be updated when the page has a lower page number than other recently written pages may consume a significant amount of system resources and, as a result, may be relatively inefficient. On the other hand, enabling substantially any page to be written into the next available space in a block may result in an inordinate number of read operations to be performed in order to locate a particular page.

By grouping pages within blocks such that a group within a physical block may be obtained in lieu of new physical block in order to write a page into the physical block when there is at least one available group within the physical block, the overall efficiency associated with writing pages may generally be improved. In other words, the likelihood that a new block will have to be obtained in order to enable data to be written may be reduced because of the possibility that a group within the new block may be available. By using groups or sub-blocks, blocks in general may be allocated more efficiently.

Figure 1A:
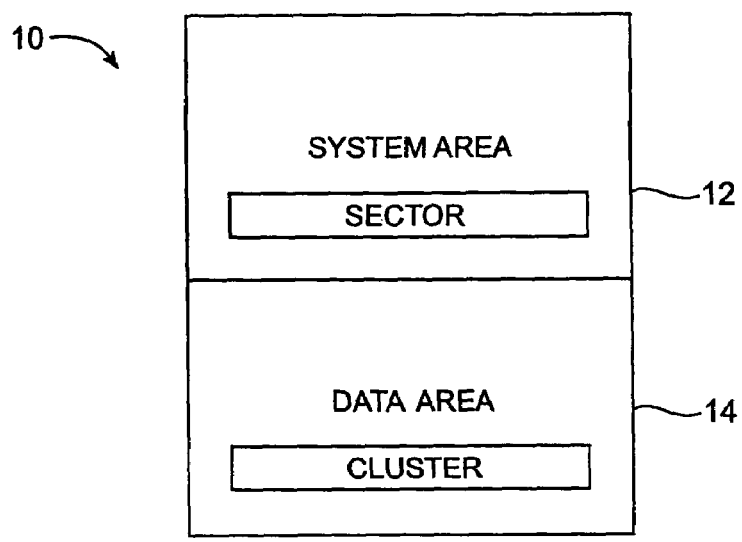
FIG. 1a is a diagrammatic representation of a memory as effectively divided by a file system.
Figure 1B:
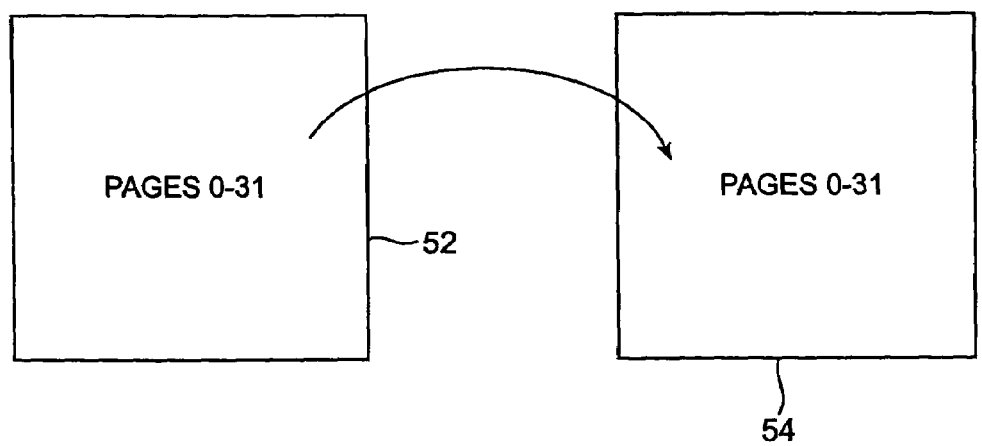
FIG. 1b is a diagrammatic representation of a mapping between a logical block and a physical block.
Figure 2A:
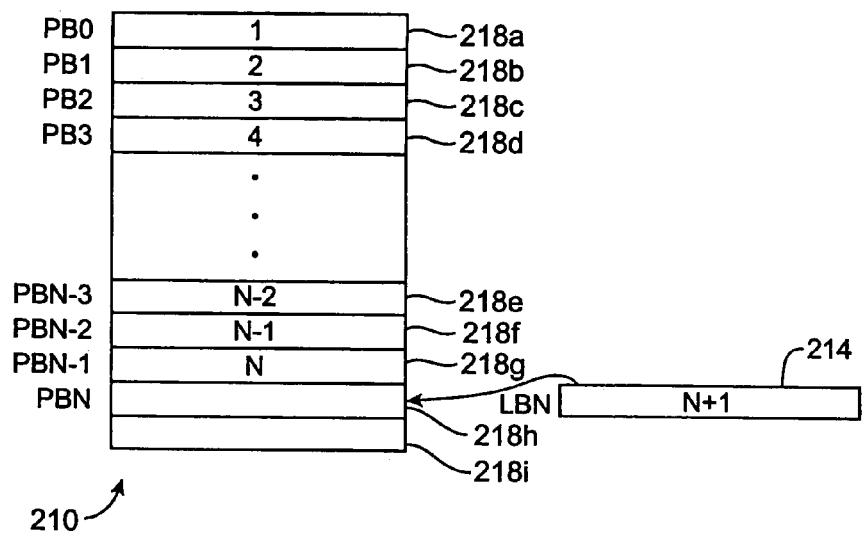
FIG. 2a is a diagrammatic representation of a physical block which is arranged to accommodate contents associated with when a logical block page in a fixed manner.
Figure 2B:
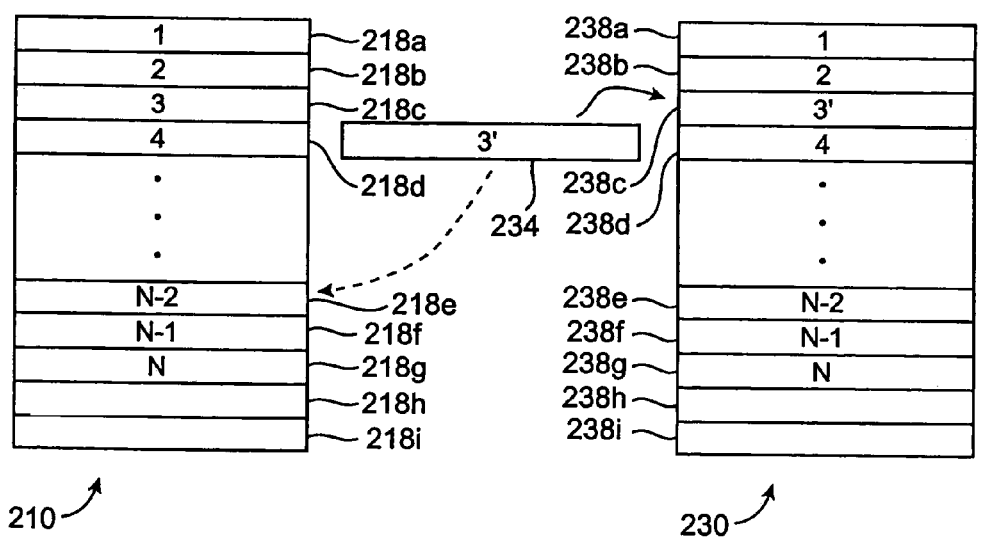
FIG. 2b is a diagrammatic representation of an old physical block, e.g., block 210 of FIG. 2a, and a new physical block which is arranged to accommodate the contents of the old block.
Figure 3:
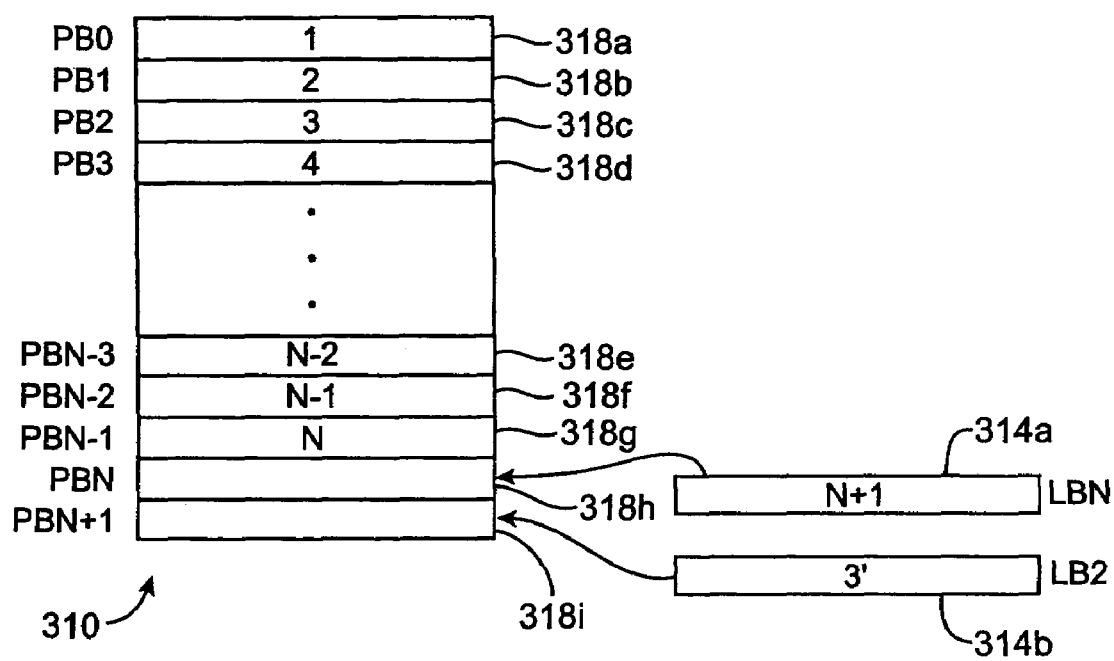
FIG. 3 is a diagrammatic representation of a physical block into which contents associated with a logical block page are to be written in a random manner.
Figure 4A:
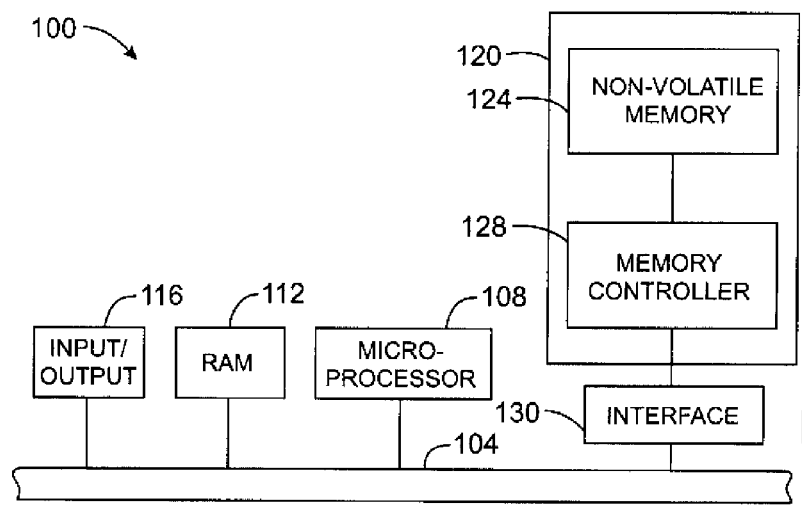
FIG. 4a is a diagrammatic representation of a general host system which includes a non-volatile memory.

Flash memory systems or, more generally, non-volatile memory devices which may benefit from the grouping of pages within a physical block generally include flash memory cards and chip sets. Typically, flash memory systems are used in conjunction with a host system such that the host system may write data to or read data from the flash memory systems. However, some flash memory systems include embedded flash memory and software which executes on a host to substantially act as a controller for the embedded flash memory, as will be discussed below with respect to FIG. 4c. Referring to FIG. 4a, a general host system which includes a non-volatile memory device, e.g., a CompactFlash memory card, will be described. A host or computer system 100 generally includes a system bus 104 which allows a microprocessor 108, a random access memory (RAM) 112, and input/output circuits 116 to communicate. It should be appreciated that host system 100 may generally include other components, e.g., display devices and networking device, which are not shown for purposes of illustration.

In general, host system 100 may be capable of capturing information including, but not limited to, still image information, audio information, and video image information. Such information may be captured in real-time, and may be transmitted to host system 100 in a wireless manner. While host system 100 may be substantially any system, host system 100 is typically a system such as a digital camera, a video camera, a cellular communications device, an audio player, or a video player. It should be appreciated, however, that host system 100 may generally be substantially any system which stores data or information, and retrieves data or information.

Host system 100 may also be a system which either only captures data, or only retrieves data. That is, host system 100 may be, in one embodiment, a dedicated system which stores data, or host system 100 may be a dedicated system which reads data. By way of example, host system 100 may be a memory writer which is arranged only to write or store data. Alternatively, host system 100 may be a device such as an MP3 player which is typically arranged to read or retrieve data, and not to capture data.

A non-volatile memory device 120 which, in one embodiment, is a removable non-volatile memory device, is arranged to interface with bus 104 to store information. An optional interface block 130 may allow non-volatile memory device 120 to interface indirectly with bus 104. When present, input/output circuit block 116 serves to reduce loading on bus 104, as will be understood by those skilled in the art. Non-volatile memory device 120 includes non-volatile memory 124 and an optional memory control system 128. In one embodiment, non-volatile memory device 120 may be implemented on a single chip or a die. Alternatively, non-volatile memory device 120 may be implemented on a multi-chip module, or on multiple discrete components which may form a chip set and may be used together as non-volatile memory device 120. One embodiment of non-volatile memory device 120 will be described below in more detail with respect to FIG. 4b.

Non-volatile memory 124, e.g., flash memory such as NAND flash memory, is arranged to store data such that data may be accessed and read as needed. Data stored in non-volatile memory 124 may also be erased as appropriate, although it should be understood that some data in non-volatile memory 124 may not be erasable. The processes of storing data, reading data, and erasing data are generally controlled by memory control system 128 or, when memory control system 128 is not present, by software executed by microprocessor 108. The operation of non-volatile memory 124 may be managed such that the lifetime of non-volatile memory 124 is substantially maximized by essentially causing sections of non-volatile memory 124 to be worn out substantially equally.

Non-volatile memory device 120 has generally been described as including an optional memory control system 128, i.e., a controller. Often, non-volatile memory device 120 may include separate chips for non-volatile memory 124 and memory control system 128, i.e., controller, functions. By way of example, while non-volatile memory devices including, but not limited to, PC cards, CompactFlash cards, MultiMedia cards, and Secure Digital cards include controllers which may be implemented on a separate chip, other non-volatile memory devices may not include controllers that are implemented on a separate chip. In an embodiment in which non-volatile memory device 120 does not include separate memory and controller chips, the memory and controller functions may be integrated into a single chip, as will be appreciated by those skilled in the art. Alternatively, the functionality of memory control system 128 may be provided by microprocessor 108, as for example in an embodiment in which non-volatile memory device 120 does not include memory controller 128, as discussed above.

Figure 4B:
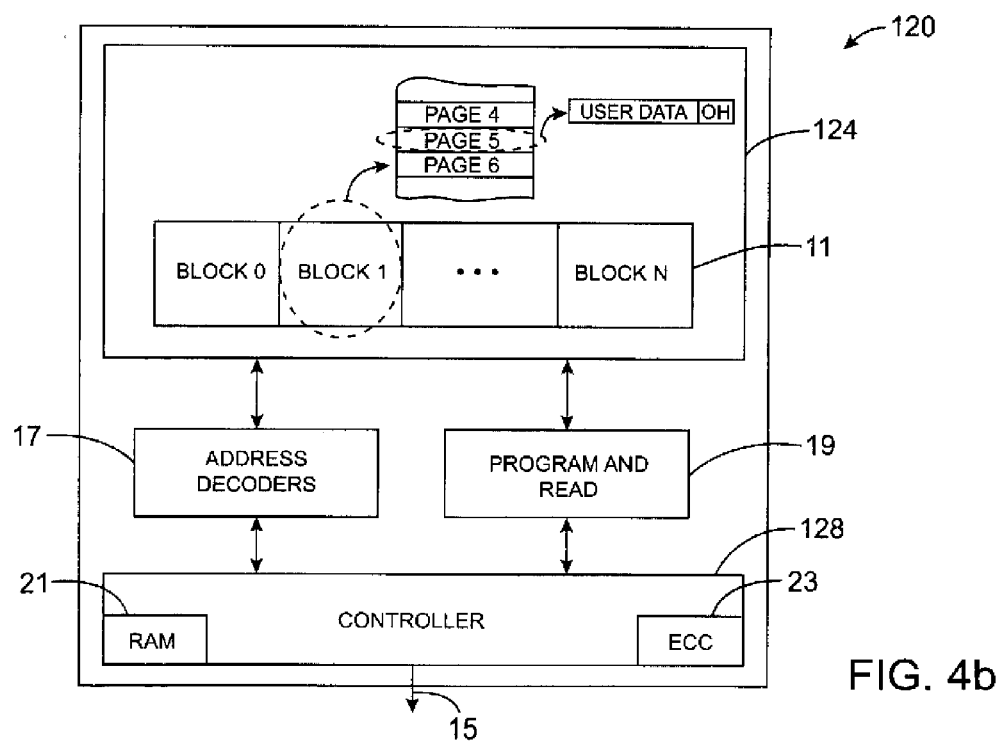

With reference to FIG. 4b, non-volatile memory device 120 will be described in more detail in accordance with an embodiment of the present invention. As described above, non-volatile memory device 120 includes non-volatile memory 124 and may include memory control system 128. Memory 124 and control system 128, or controller, may be primary components of non-volatile memory device 120, although when memory 124 is an embedded NAND device, for example, non-volatile memory device 120 may not include control system 128. Memory 124 may be an array of memory cells formed on a semiconductor substrate, wherein one or more bits of data are stored in the individual memory cells by storing one of two or more levels of charge on individual storage elements of the memory cells. A non-volatile flash electrically erasable programmable read only memory (EEPROM) is an example of a common type of memory for such systems.

When present, control system 128 communicates over a bus 15 to a host computer or other system that is using the memory system to store data. Bus 15 is generally a part of bus 104 of FIG. 4a. Control system 128 also controls operation of memory 124, which may include a memory cell array 11, to write data provided by the host, read data requested by the host and perform various housekeeping functions in operating memory 124. Control system 128 generally includes a general purpose microprocessor which has associated non-volatile software memory, various logic circuits, and the like. One or more state machines are often also included for controlling the performance of specific routines.

Memory cell array 11 is typically addressed by control system 128 or microprocessor 108 through address decoders 17. Decoders 17 may apply the correct voltages to gate and bit lines of array 11 in order to program data to, read data from, or erase a group of memory cells being addressed by the control system 128. Additional circuits 19 may include programming drivers that control voltages applied to elements of the array that depend upon the data being programmed into an addressed group of cells. Circuits 19 may also include sense amplifiers and other circuits necessary to read data from an addressed group of memory cells. Data to be programmed into array 11, or data recently read from array 11, may be stored in a buffer memory 21 which, as shown, may be located within control system 128. Control system 128 also may contain various registers for temporarily storing command and status data, and the like.

Array 11 may be divided into a large number of BLOCKS 0-N memory cells. As is common for flash EEPROM systems, a block may be the smallest unit of erase. That is, each block may contain the minimum number of memory cells that are erased together. Each block is typically divided into a number of pages. As will be appreciated by those skilled in the art, a page may be the smallest unit of programming. That is, a basic programming operation writes data into or reads data from a minimum of one page of memory cells. One or more sectors of data are typically stored within each page. As shown in FIG. 4b, one sector includes user data and overhead data. Overhead data typically includes an error correction code (ECC) that has been calculated from the user data of the sector. A portion 23 of the control system 128 may calculate the ECC when data is being programmed into array 11, and may also check the ECC when data is being read from array 11. Alternatively, the ECCs are stored in different pages, or different blocks, than the user data to which they pertain.

A sector of user data is typically 512 bytes, corresponding to the size of a sector in magnetic disk drives. Overhead data, in the described embodiment, is typically an additional 16 bytes. One sector of data is most commonly included in each page but two or more sectors may instead form a page. Any number of pages may generally form a block. By way of example, a block may be formed from eight pages up to 512, 1024 or more pages. The number of blocks is chosen to provide a desired data storage capacity for the memory system. Array 11 is typically divided into a few sub-arrays (not shown), each of which contains a proportion of the blocks, which operate somewhat independently of each other in order to increase the degree of parallelism in the execution of various memory operations. An example of the use of multiple sub-arrays is described in U.S. Pat. No. 5,890,192, which is incorporated herein by reference in its entirety.

Figure 4C:
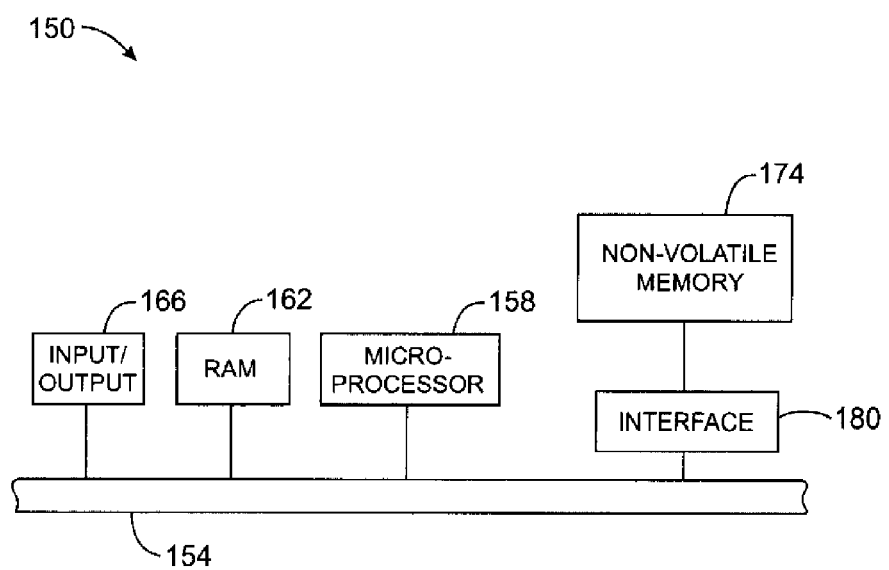
FIG. 4c is a diagrammatic representation of a host system which includes an embedded non-volatile memory.

In one embodiment, non-volatile memory is embedded into a system, e.g., a host system. FIG. 4c is a diagrammatic representation of a host system which includes an embedded non-volatile memory. A host or computer system 150 generally includes a system bus 154 which allows a microprocessor 158, a RAM 162, and input/output circuits 166, among other components (not shown) of host system 150, to communicate. A non-volatile memory 174, e.g., a flash memory, allows information to be stored within host system 150. An interface 180 may be provided between non-volatile memory 174 and bus 154 to enable information to be read from and written to non-volatile memory 174.

Non-volatile memory 174 may be managed by microprocessor 158 which effectively executes either or both software and firmware which is arranged to control non-volatile memory 174. That is, microprocessor 158 may run code devices (not shown), i.e., software code devices or firmware code devices, which allow non-volatile memory 174 to be controlled. Such code devices, which may be a flash memory packaged with CPU inside microprocessor 158, a separate flash ROM, or inside non-volatile memory 174, which will be described below, may enable physical blocks in non-volatile memory 174 to be addressed, and may enable information to be stored into, read from, and erased from the physical blocks.

Figure 5:
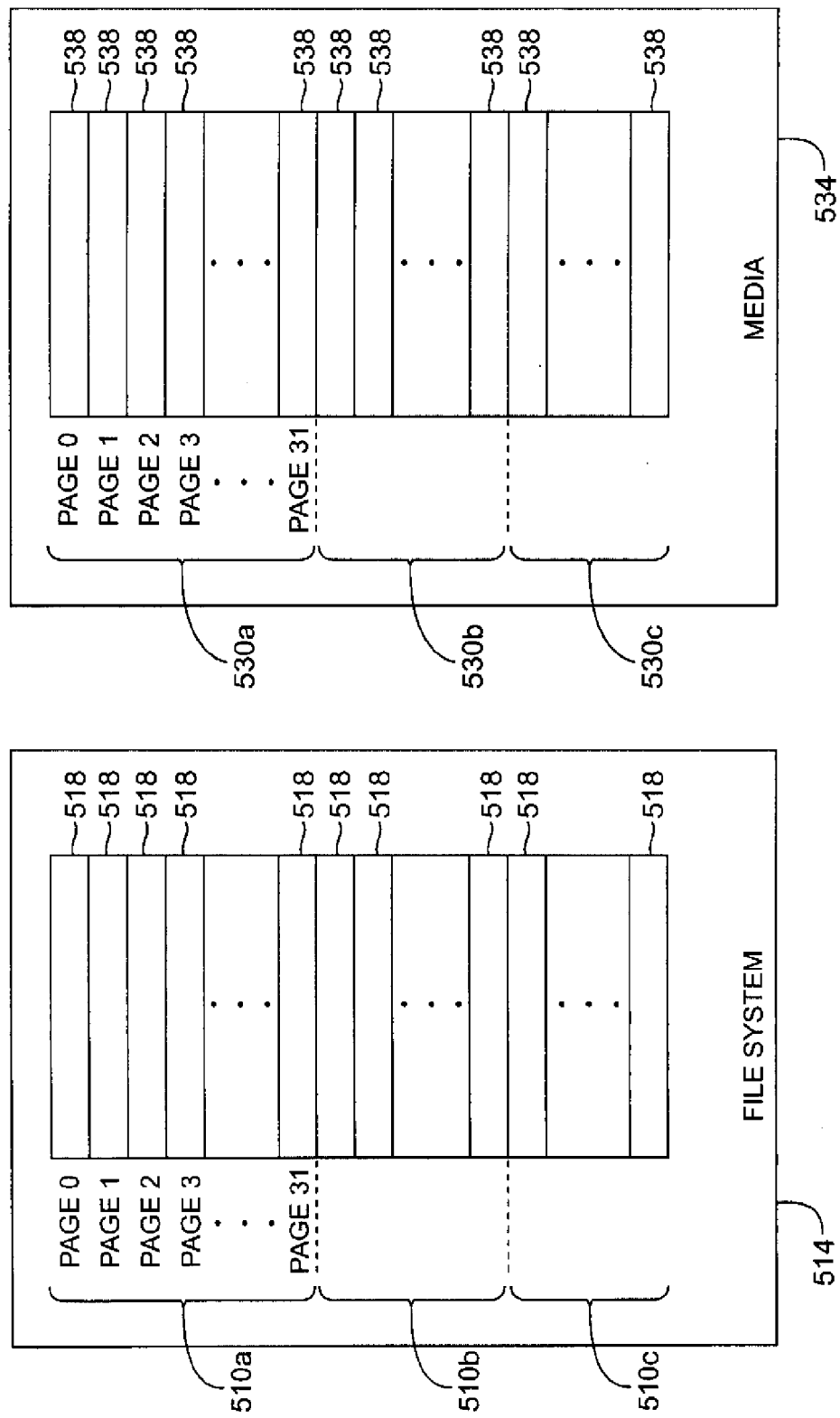
FIG. 5 is a diagrammatic representation of a file system with logical blocks and a media with physical blocks in accordance with an embodiment of the present invention.

In general, when a user writes data, the user effectively writes data using a file system. The file system associates the data with a logical block or, more specifically, pages of a logical block, that is mapped to a physical block associated with a storage media. FIG. 5 is a diagrammatic representation of a file system with logical blocks and a media with physical blocks in accordance with an embodiment of the present invention. Logical blocks 510 of a file system 514 include any number of pages 518. The number of pages 518 included in a logical block, e.g., logical block 510a, depends on the size of an erase unit. For example, approximately thirty-two pages may be included in logical block 510a, as shown, when the smallest erase unit contains approximately thirty-two pages.

Physical blocks 530 of a media 534, e.g., an embedded flash memory, include a number of pages 538. As will be appreciated by those skilled in the art, the number of pages 538 included in physical blocks 530 is typically the same as the number of pages 518 included in logical blocks 530.

Using a data manager or data management software, as will be discussed below with respect to FIG. 5, logical blocks 510 may be mapped to physical blocks 530. Mappings between logical blocks 510 and physical blocks 530 may each be a one-to-one mapping, i.e., a mapping in which a first logical block 510 at a logical block address is mapped to a first physical block 530a at a physical block address which is substantially the same as the logical block address. However, mappings between logical blocks 510 and physical blocks 530 are often such that first logical block 510a at a logical block address is not mapped to first physical block 530a and is, instead, mapped to a different physical block, e.g., physical block 530c, which has a physical block address that is not the same as the logical block address.

Figure 6:
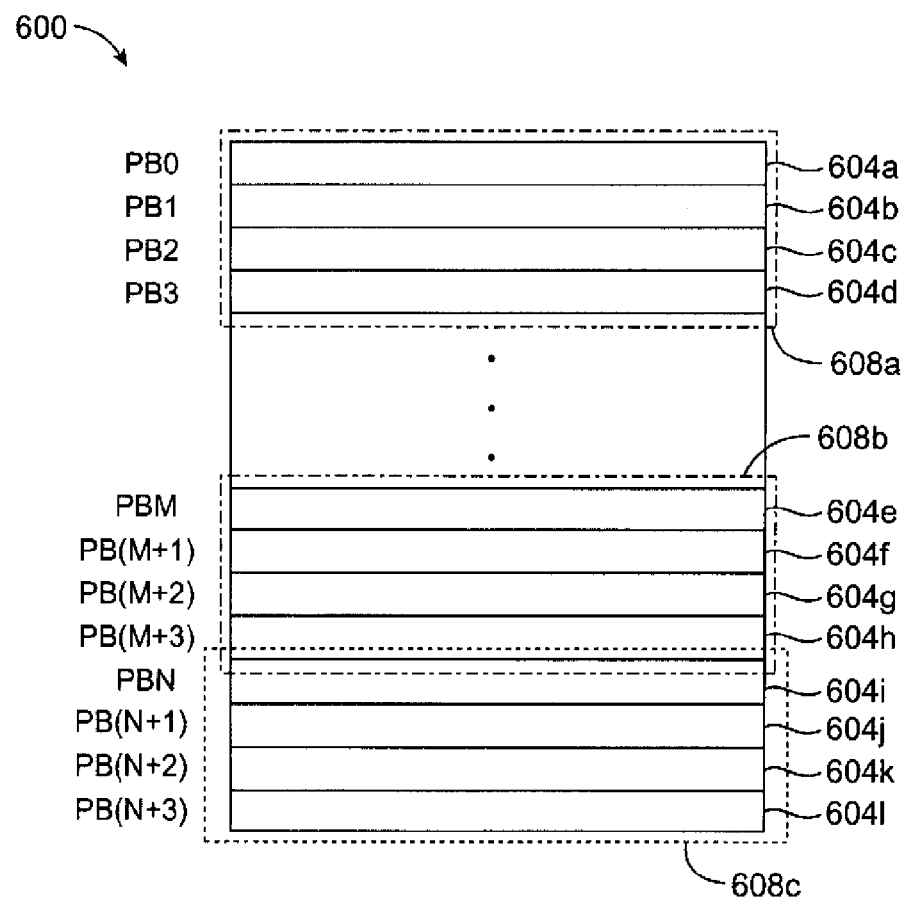
FIG. 6 is a diagrammatic representation of a block with pages which are arranged into groups in accordance with an embodiment of the present invention.

Although a set of page addresses associated with a logical block may effectively all correspond to a set of page addresses associated physical block, e.g., a logical block may be associated with logical pages 0-31 while a physical block may be associated with physical pages 0-31, the contents associated with a given logical page address may not necessarily be located at a corresponding physical page address. In order to facilitate access to desired contents contained associated with a logical block and physically contained in a physical block, pages associated with a block may be grouped into a plurality of groups or sub-blocks. Either or both pages associated with a logical block and pages associated with a physical block may be grouped into groups or units. FIG. 6 is a diagrammatic representation of a block with pages which are arranged into groups in accordance with an embodiment of the present invention. A block 600 includes pages 604. It should be appreciated that block 600 may generally include any number of pages 604.

Pages 604 are arranged into groups 608. In general, both the number of groups 608 within block 600, and the number of pages 604 within a group 608, may vary widely. Typically, the number of pages 604 within a group 608 is chosen such that substantially any cluster size may be accommodated. For example, in some systems, a cluster size may be approximately four pages 604. When a cluster size is approximately four pages 604, the number of pages 604 within a group 608 may be a multiple of four, e.g., there may be four or eight pages 604 per group 608.

As will be appreciated by those skilled in the art, a cluster is generally considered to be the minimum size for a file. Hence, even when a file system attempts to write substantially only one byte for a file, the entire cluster is effectively assigned to that file. A subsequent file will typically be written into other clusters.

Returning to FIG. 6, in the embodiment as shown, each group 608 includes four pages 604. The order of pages 604 within each group 608 is fixed relative to the beginning of each group 608. By way of example, the order of pages 604a-d within group 608a is fixed, as is the order of pages 604e-h of group 608b. While the order of pages 604 within each group 608 is fixed relative to the beginning of each group 608, the order of groups 608 within block 600 is generally not fixed.

Figure 7:
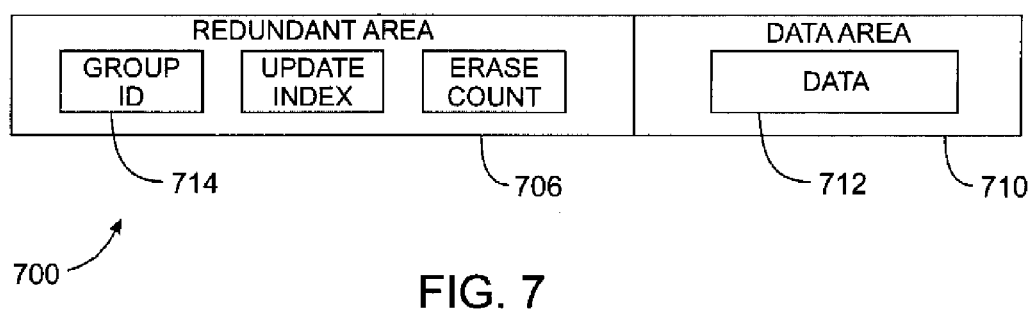
FIG. 7 is a diagrammatic representation of a page in accordance with an embodiment of the present invention.

Each logical page and physical page generally includes a redundant area and a data area. In the described embodiment, a redundant area or overhead area may include up to approximately sixteen bytes of information which includes, but is not limited to, a group identifier which may be a byte which identifies the group which a particular page belongs to. FIG. 7 is a diagrammatic representation of a page in accordance with an embodiment of the present invention. A page 700 includes a redundant area 706 and a data area 710. In general page 700 includes approximately 528 bytes, of which approximately sixteen bytes may be included in redundant area 706 and approximately 512 bytes may be included in data area 710. Although redundant area 706 may be associated with the last bytes in page 700, in the described embodiment, redundant area 706 is associated with the first bytes of page 700.

Data area 710 is arranged to store data contents 712, e.g., user data contents. Redundant area 706 is arranged to include information which may enable page 700 to be tracked. For example, redundant area 706 may include a group identifier 714 which identifies which group, i.e., group within a block, page 700 is a part of. In order to facilitate the identification of a group, group identifier 714 may be the first byte associated with redundant area 706 and, hence, page 700.

Typically, when page 700 is not to be read unless group identifier 714 matches an identifier of a particular group, group identifier 714 is read and a check is made, e.g., using software or firmware within an overall system, to determine whether group identifier 714 matches the identifier associated with a particular group. Since group identifier 714 is the first byte associated with page 700, reading group identifier 714 requires relatively little overhead, and is relatively efficient. If group identifier 714 matches the identifier for a particular group, then data 712 may be read, in addition to the remainder of redundant area 706. On the other hand, if group identifier 714 does not match the identifier for the particular group, then data 712 and the remainder of redundant area 706 are not read.

By substantially only reading all bits associated with page 700 when group identifier 714 matches the identifier of a particular group, when group identifier 714 does not match the identifier of a particular group, the transfer time which would typically be associated with the transfer of approximately 527 bytes of data may be substantially eliminated. In other words, when group identifier 714 does not match the identifier of a particular group, then the time associated with reading or transferring the remaining bytes in page 700 may effectively be eliminated.

Alternatively, if the remaining bytes are to be read, e.g., because group identifier 714 matches the identifier of a particular group, then one access time, or the time which elapses between issuing a command to read data and the data being ready for transfer from the flash memory, is effectively saved. Redundant area 706 may also be placed after data area 710. Although a read operation may not be as optimized when redundant area 706 is placed after data area 710, the performance of a write operation is still generally enhanced due to a lower number of block erase operations, as described earlier.

Figure 8A:
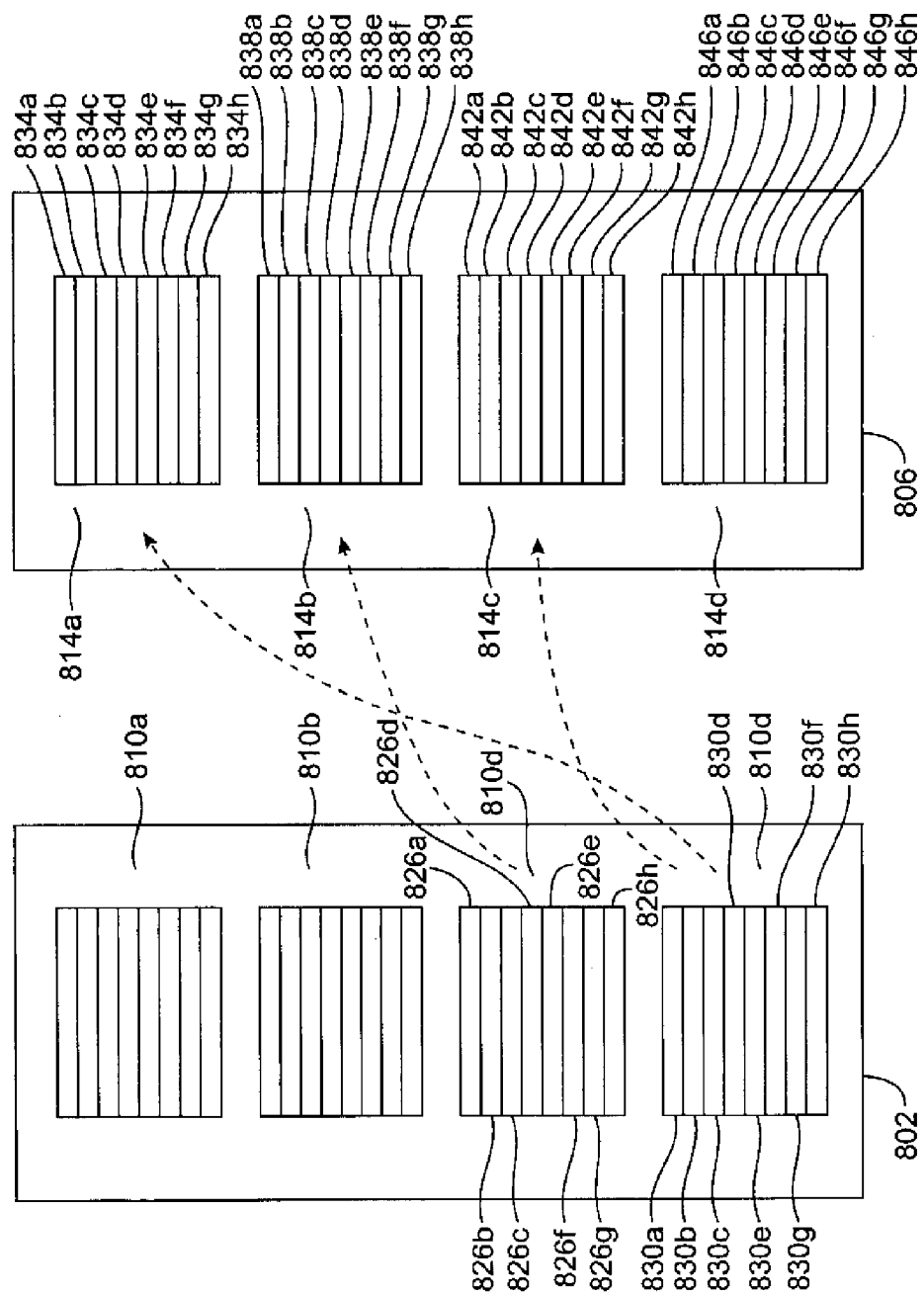
FIG. 8a is a diagrammatic representation of a logical block and a physical block which are each divided into groups in accordance with an embodiment of the present invention.

FIG. 8*a* is a diagrammatic representation of a logical block and a physical block which are each divided into groups in accordance with an embodiment of the present invention. Logical block 802 and physical block 806 are evenly divided into groups 810 and groups 814, respectively. In one embodiment, the number of groups 810, 814 is typically a power of two. For example, there may be one, two, four, or eight groups 810 in logical block 802.

Logical block 802 and physical block 806 each include thirty-two pages, although it should be understood that the number of pages in logical block 802 and physical block 806 may vary widely. Each group 810 in logical block 802 includes eight pages, e.g., group 810*c* includes eight pages 826, and each group 814 in physical block 806 includes eight pages, e.g., group 814*a* includes eight pages 834. Typically, the page order in each group 810, 814 is substantially fixed. By way of example, within group 810*c*, a first page 826*a* is substantially fixed as "page 0" and an eight page 826*h* is substantially fixed as "page 7." As such, writing overall "page 30" of physical block 806 may be substantially equivalent to writing "page 6" 846*g* of group 814*d*, when groups 814 are ordered such that group 814*a* is "group 0" and group 814*d* is "group 3."

In general, the order of groups 814 within physical block 806 may be random. The actual group number of a group 814 may be stored in the redundant area of a page, as discussed above with respect to FIG. 7. Group numbers stored in pages 834 of group 814*a* are arranged to identify pages 834 as being included in group 814*a*. Similarly, group numbers stored in pages 838 identify pages 838 as being included in group 814*b*, group numbers stored in pages 842 identify pages 842 as being included in group 814*c*, and group numbers stored in pages 846 identify pages 846 as being included in group 814*d*.

As shown, the data area of pages 834 in physical group 814*a*, i.e., physical "group 0", are arranged to store data associated with logical group 810*d*. Pages 842 of physical group 814*c* are also arranged to store data associated with logical group 810*d*. The data associated with logical group 810*c* is arranged to be stored in the data area of pages 838 of physical group 814*b*. Specifically, in the described embodiment, data associated with logical group 810*d* is written into physical group 814*a*, then data associated with logical group 810*c* is written into physical group 814*b*. After physical group 814*b* is written to, then data associated with logical group 810*d* is written again, this time into physical group 814*c*.

With respect to FIG. 8*b*, one example of how physical groups 814 of physical block 806 may be written to such that group associations are as shown in FIG. 8*a* will be described in accordance with an embodiment of the present invention. A user may elect to write data associated with logical "page 1" 830*b* of logical group 810*d* into physical group 814*a* or, more specifically, physical "page 1" 834*b* of physical group 814*a*, as indicated at 860. Once physical "page 1" 834*b* is written into, the user may write data associated with logical "page 3" 830*d* into physical "page 3" 834*d* of physical group 814*a*, as indicated at 862.

If the next user command is to write data associated with logical group 810*c*, then even when additional pages 834 are available within physical group 814*a*, the data associated with logical group 810*c* is written into a substantially empty physical group 814, or a physical group 814 which is in a substantially erased state. For example, data associated with logical "page 2" 826*c* of group 810*c* may be written into physical "page 2" 838*c* of group 814*b*, as indicated at 864. Other pages associated with logical group 810*c* may be written into group 814*b*, as indicated at 866 and 868.

Once data associated with logical block 810*c* is written, the user may decide to write data associated with logical block 810*d* once again. As such, data associated with logical "pages 5-7" 830*f-h* of group 810*d* may be written into appropriate physical pages 842 of group 814*c*, as indicated at 870, 872, 874. Typically, data associated with logical "pages 5-7" 830*f-h* may not be written into physical group 814*a* because of an out-of-sequence write violation which may occur due to the fact that physical group 814*b* has already be written to and writing to group 814*a* after group 814*b* would generally not be allowed. As a result, data associated with logical group 810*d* may be located in physical group 814*a* and physical group 814*c*.

Data associated with higher overall logical block addresses associated with logical block 802 may be stored in physical pages of physical block 806 with lower overall physical block addresses than data associated with lower overall logical block addresses. By way of example, the overall logical block address associated with logical page 830*b* may higher than the overall logical block address associated with logical page 826*c*, although contents associated with logical page 830*b* may be written into physical page 834*b* which may have a lower overall physical block address than physical page 838*c* into which the contents associated with logical page 826*c* may be written.

In the event that a previously written page is overwritten, e.g., data associated with logical "page 1" 830*b* is written into physical group 814*d* (not shown) at some time after logical "page 1" 830*b* has been written into "page 1" 834 and physical group 814*b* has been written into, then the contents stored in the data area of "page 1" 834*b* may be considered to be invalid. As such, a command to retrieve the contents associated with logical "page 1" 830*b* may cause physical block 806 to effectively be searched backwards until a corresponding physical page is found. In other words, physical group 814*d* may be searched first, followed by physical group 814*c*, physical group 814*b*, and physical group 814*a*. The backwards searching will generally allow the most current data to be accessed.

Physical group 814*d* remains substantially unassigned, as shown, after physical groups 814*a-c* have been written into. In the event that logical group 810*b* is to be written, data associated with logical group 810*b* may be written into physical group 814*d*. That is, physical group 814*d* may effectively be assigned to logical group 810*b*, as shown in FIG. 8*c*. Data associated with logical group 810*b* is written into physical group 814*d*, while data associated with logical group 810*c* is written into physical group 814*b*. Logical group 810*d* is associated with both physical group 814*a* and physical group 814*c*.

When physical group 814*d* is assigned to logical group 810*b*, and data associated with logical group 810*b* is written into data areas of physical group 814*d*, then if data associated with logical group 810*d* is to be written again, there are no available physical groups 814 into which data may be written. As such, a new, e.g., spare, physical block is effectively obtained to be the physical block which corresponds to logical block 802. In other words, a new physical block is allocated such that substantially all current data associated with physical block 806, e.g., the current physical block, and new user data may be merged into the new physical block.

Figure 8B:
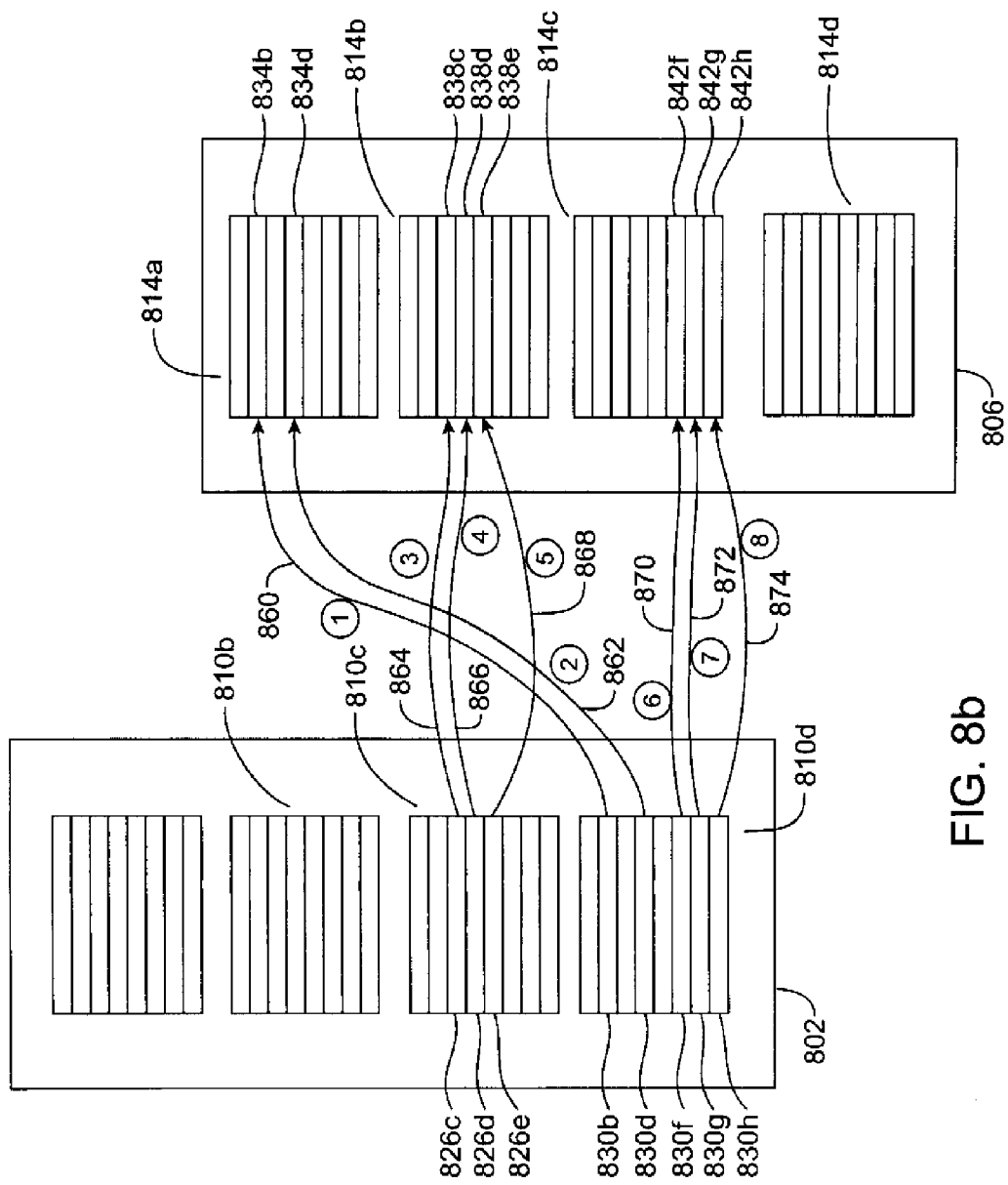
FIG. 8b is a diagrammatic representation of a logical block and a physical block, i.e., logical block 802 and physical block 806 of FIG. 8a, which indicates how groups within the physical block may be written to in accordance with an embodiment of the present invention.
Figure 8C:
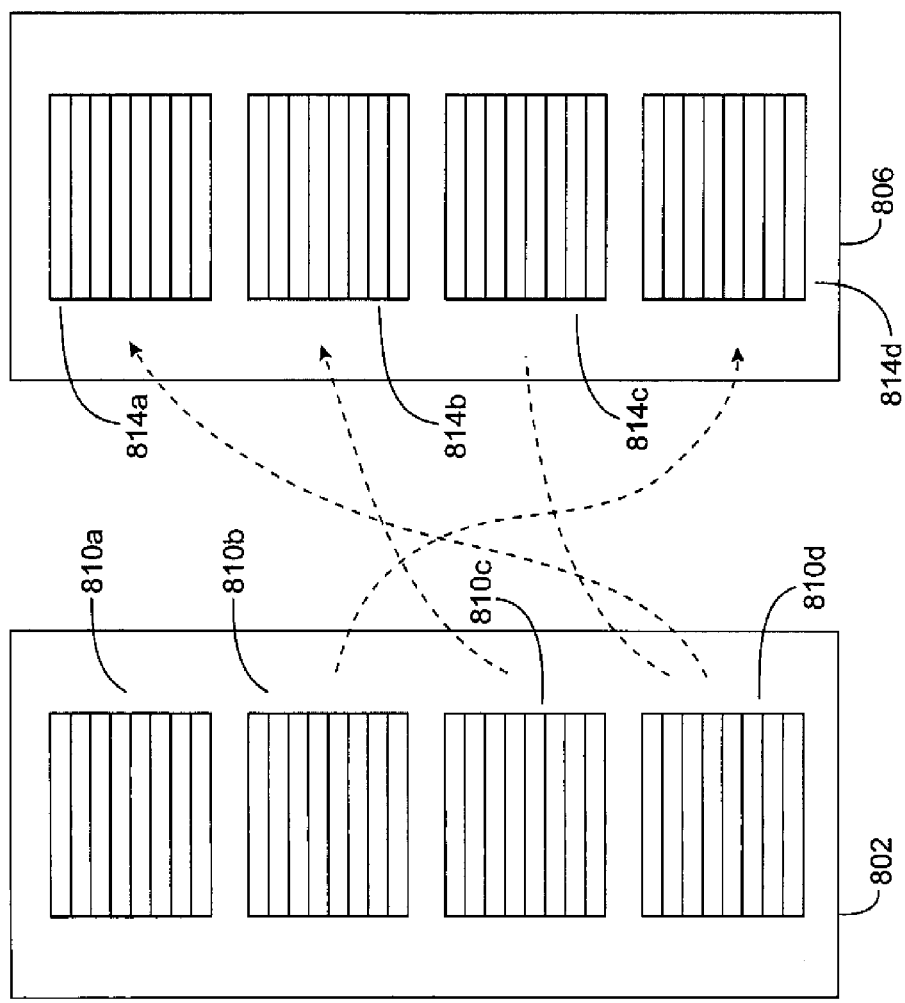
FIG. 8c is a diagrammatic representation of a logical block and a physical block, i.e., logical block 802 and physical block 806 of FIG. 8a, which indicates how groups within the blocks may be associated in accordance with an embodiment of the present invention.
Figure 8D:
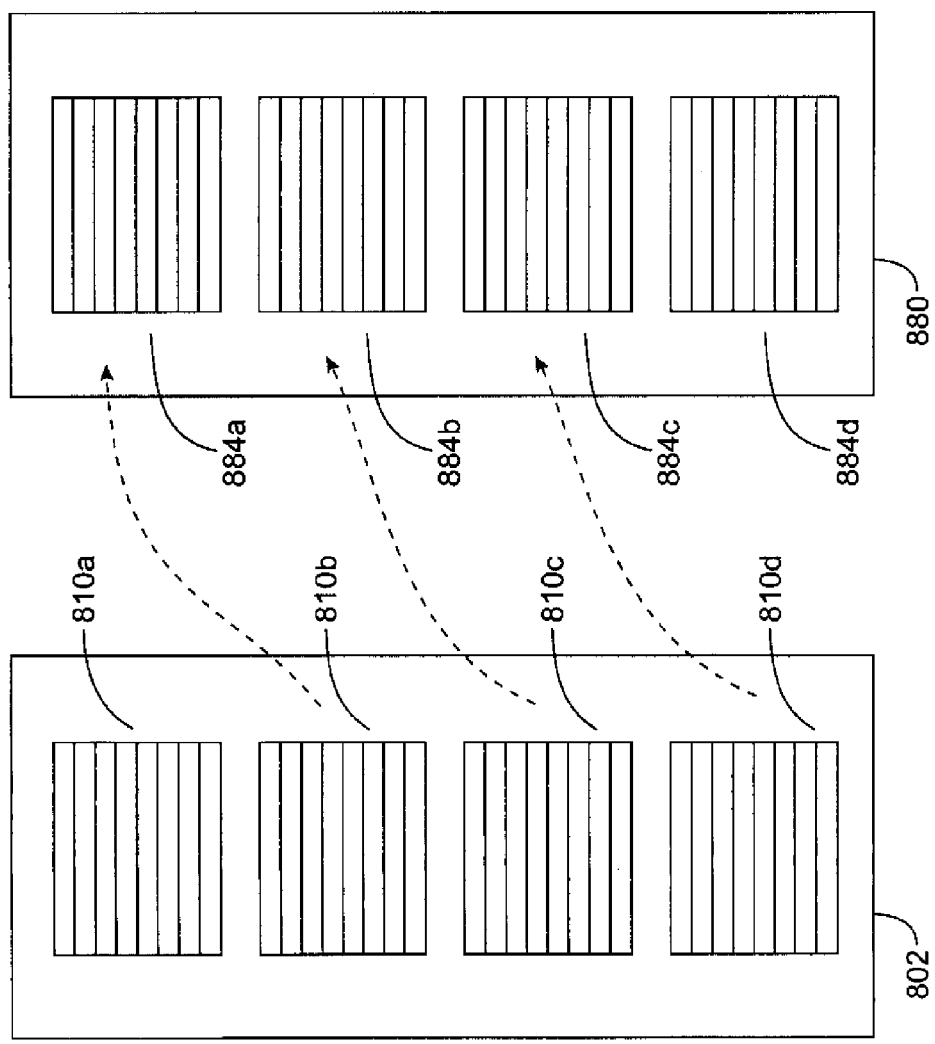
FIG. 8d is a diagrammatic representation of the associations between a logical block, i.e., logical block 802 of FIGS. 8a-c, and a new physical block after a merge operation in accordance with an embodiment of the present invention.

FIG. 8*d* is a diagrammatic representation of the associations between a logical block, i.e., logical block 802 of FIGS. 8*a-c*, and a new physical block after a merge operation in accordance with an embodiment of the present invention. When the contents of physical block 806 of FIG. 8*c* and new user data associated with logical block 802 are merged into a new physical block 880, it should be understood that empty and invalid pages, as for example pages which have effectively been overwritten, are not written into new physical block 880. In addition, new data such as data which prompted new physical block 880 to be allocated because of a lack of available space in physical block 806 of FIG. 8*c* effectively overrides existing data which corresponds to the new data, i.e., new data overrides existing data which is associated with the same logical page as the new data.

Once a merge has occurred and new data has been written into new physical block 880, the association between logical block 802 and new physical block 880 may be such that data associated with group 810*b* of logical block 802 is stored in a physical group 884*a*, data associated with group 810*c* of logical block 802 is stored in a physical group 884*b*, and data associated with group 810*d* of logical block 802 is stored in a physical group 884*c*. A physical group 884*d* remains in a substantially erased state until physical group 884*d* is needed. As will be appreciated by those skilled in the art, once data is merged into or otherwise written into new physical block 880, original physical block 806 of FIG. 8*a* may be erased and made available for use as a spare physical block.

Figure 9:
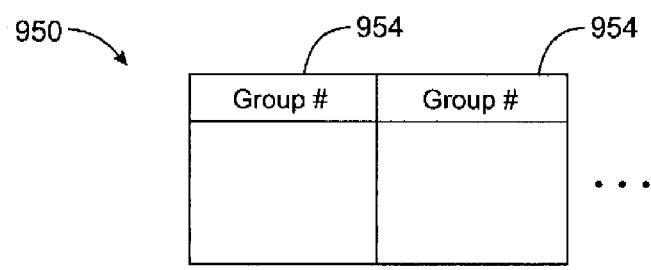
FIG. 9 is a diagrammatic representation of a current working block information table in accordance with an embodiment of the present invention.

In order to enable read operations which access group identifiers associated with pages to occur more efficiently, a current working block information table may be built, e.g., in RAM 162 of FIG. 4*c*, when a page in a current block is read or written. FIG. 9 is a diagrammatic representation of a current working block information table in accordance with an embodiment of the present invention. An information table 950 is arranged to store group numbers 954. When a page is read, its group number 954 is stored into information table 950. Storing group number 954 typically serves to reduce the number of reads for the next read request of the same block, i.e., the block which includes the page whose group number 954 is stored in information table 950. Typically, substantially information pertaining to a current working block is maintained in information table 950. In order to substantially minimize the RAM requirements within an overall system, information table 950 may be built only for the block currently being accessed. When a different block is accessed, the information in an existing information table is effectively replaced by the information of the new block.

Figure 10A:
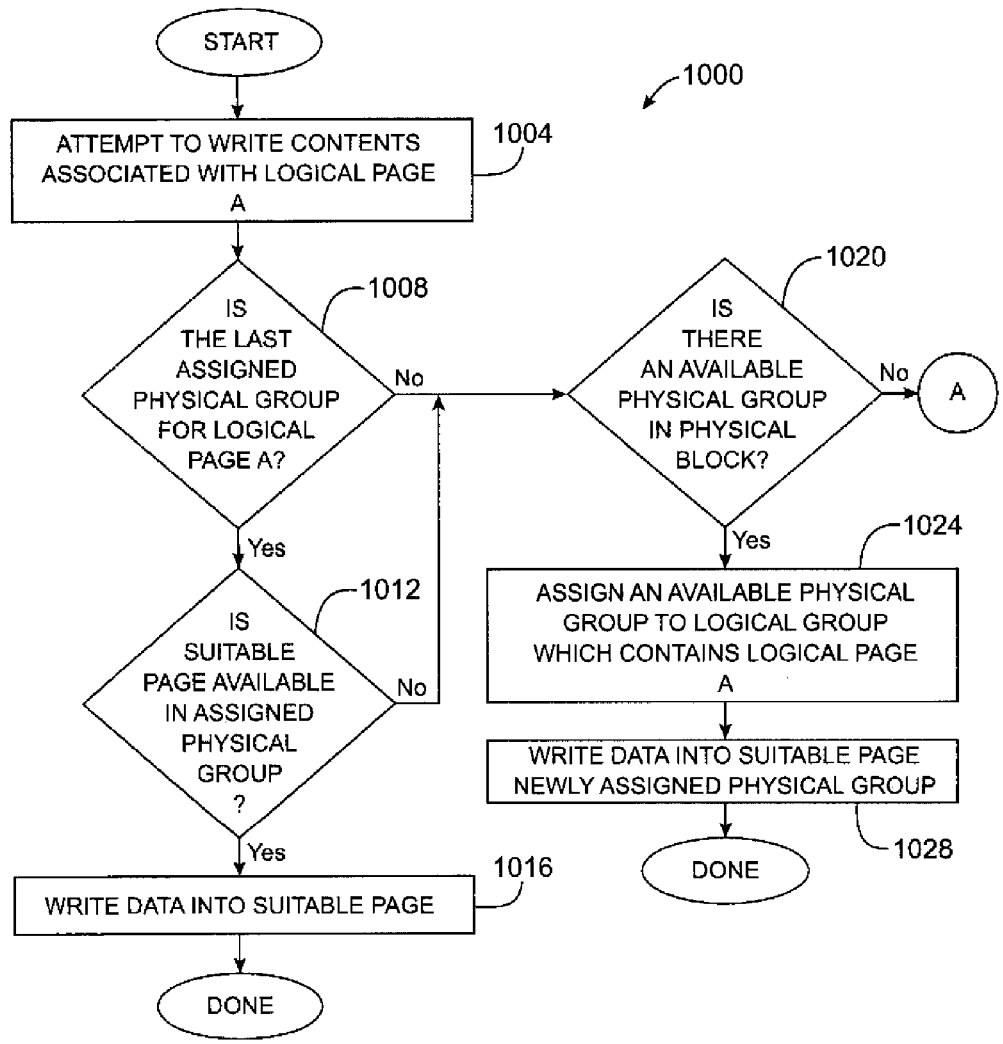
FIGS. 10a and 10b are a process flow diagram which illustrates the steps associated with one method of writing contents associated with a logical page which is part of a logical group into a physical page which is part of a physical group in accordance with an embodiment of the present invention.
Figure 10B:
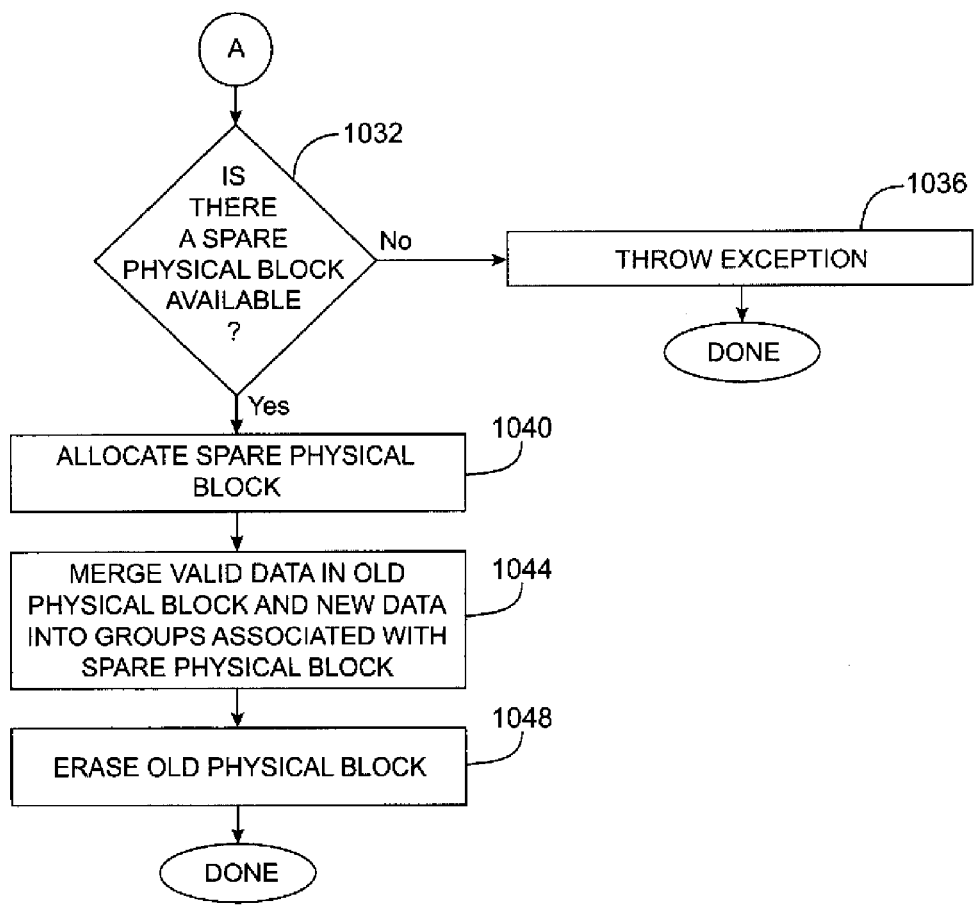

With reference to FIGS. 10*a* and 10*b*, the steps associated with one method of writing contents associated with a logical page which is part of a logical group into a physical page which is part of a physical group will be described in accordance with an embodiment of the present invention. A process 1000 of writing contents into a physical page begins at step 1004 in which contents which are to be written into a physical page are identified. That is, new data which is to be written and is associated with a logical page, e.g., logical page "A," is obtained or otherwise identified.

Once contents that are to be written are identified, a determination is made in step 1008 regarding whether there is a physical group which corresponds to logical page "A." In other words, it is determined if logical page "A" or, more generally, the logical group which includes logical page "A" is the same as the last assigned or associated physical group. It if is determined that it is the last assigned physical group of logical page "A," then a determination is made in step 1012 as to whether there is a suitable page available in the assigned physical group into which the contents associated with logical page "A" may be written. A determination of whether there is a suitable page may include a determination of whether there would be an out-of-sequence write violation if the contents associated with logical page "A" were to be written into the assigned physical group. The determination may also include determining whether there is an unwritten page in the assigned physical group which is available for the contents associated with logical page "A."

If it is determined that there is a suitable page available in the assigned physical group in step 1012, then the data or contents associated with logical page "A" are written into the suitable page in step 1016. It should be appreciated that substantially any suitable method may be used to write data into a physical page. After the data is written, the process of writing data into a physical page of a physical group is completed.

Alternatively, if it is determined in step 1012 that there is no suitable page available in the assigned physical group, then the indication may be that pages in the assigned physical are full, or that there are not suitable pages available that would not cause an out-of-sequence write violation. As such, process flow moves from step 1012 to step 1020 in which it is determined if there is an available physical group in the physical block. In other words, it is determined in step 1020 whether there is a group within the physical block which is not yet associated with a particular logical group.

When it is determined that there is an available physical group, then the available physical group is effectively assigned to the logical group which includes logical page "A" in step 1024. Once the available physical group is assigned to the logical group, the data or contents associated with logical page "A" is written into a suitable page in the newly assigned physical group in step 1028. Once the data is written, the process of writing data into a physical page of a physical group is completed.

Returning to step 1020 and the determination of whether there is an available physical group in the physical block assigned to logical page "A," if it is determined that there is no available physical group, then the implication is that the data or contents associated with logical page "A" may not be written into the physical block, i.e., the current physical block. Accordingly, process flow proceeds to step 1032 in which it is determined if there is a spare physical block available. If it is determined that there is no spare physical block available, then an exception is thrown in step 1036 which indicates that the contents associated with logical page "A" may not be written. Once the exception is thrown, the process of writing data into a physical page of a physical group is terminated, and a failing indication is typically reported. The design of the controller software and firmware will normally prevent this situation from substantially ever happening unless the flash memory is utilized to its end of life evenly.

On the other hand, if it is determined in step 1032 that there is an available spare physical block, the spare physical block is allocated for use with the logical block which includes logical page "A" in step 1040. Then, in step 1044, valid data from the "old" physical block that was previously assigned to the logical block which includes logical page "A" is merged into groups within the "new" or spare physical block. In addition, the new data, or the contents associated with logical page "A" which were obtained in step 1004, is written into a page of a group associated with the spare physical block. After the valid data from the old physical block is merged into the spare physical block, the old physical block is erased in step 1048. Erasing the old physical block may enable the old physical block to be subsequently used as a spare physical block, e.g., if the old physical block has not substantially reached the end of its life. Once the old physical block is erased, the process of writing data into a physical page of a physical group is terminated.

Figure 11:
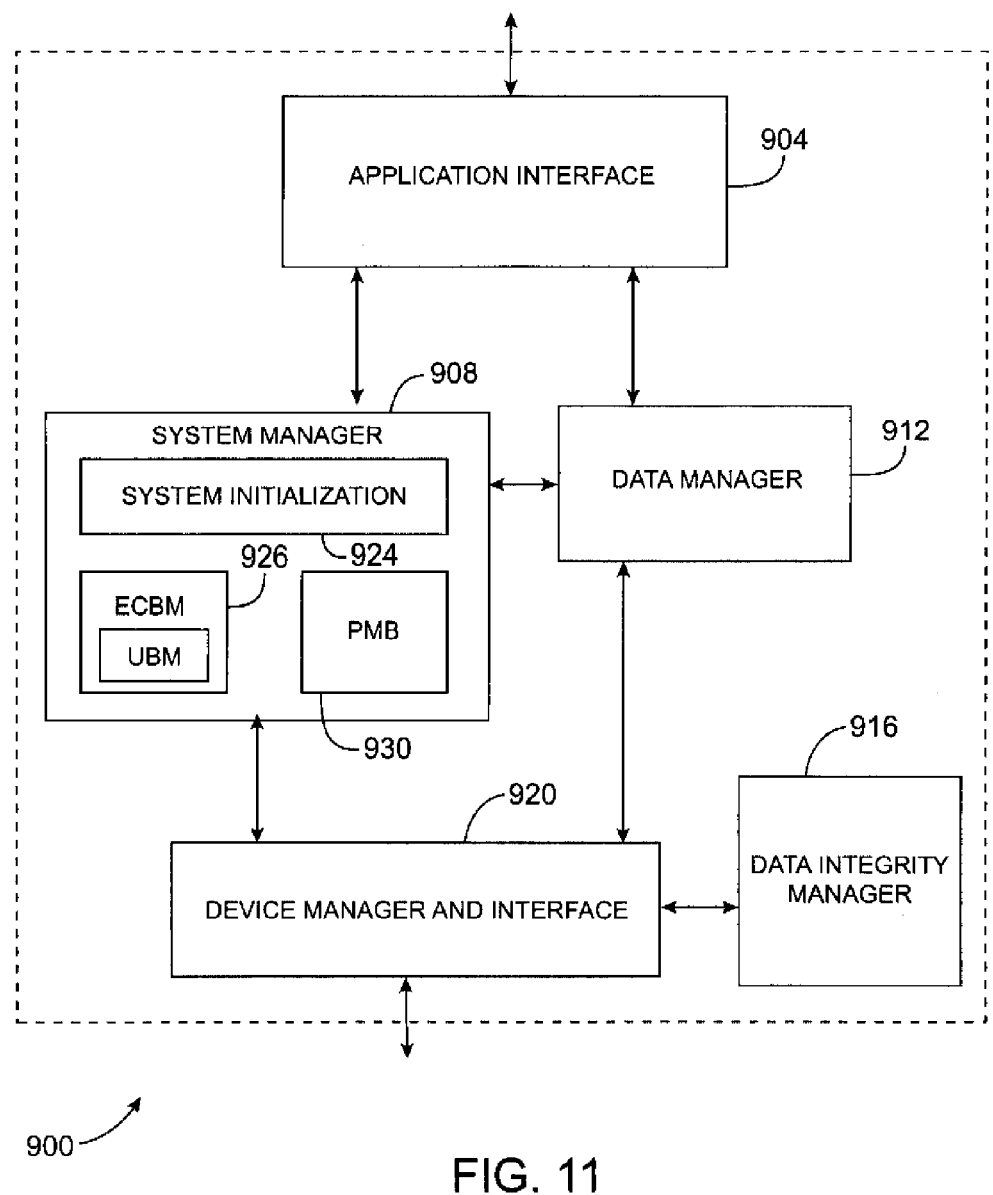
FIG. 11 is a diagrammatic block diagram representation of a system architecture in accordance with an embodiment of the present invention.

In general, the functionality associated with grouping pages within blocks is provided in software, e.g., as program code devices, or as firmware to a host system. One embodiment of a suitable system architecture associated with the software or firmware provided to a host system to enable wear leveling to occur is shown in FIG. 11. A system architecture 900 generally includes a variety of modules which may include, but are not limited to, an application interface module 904, a system manager module 908, a data manager module 912, a data integrity manager 916, and a device manager and interface module 920. In general, system architecture 900 may be implemented using software code devices or firmware which may be accessed by a processor, e.g., processor 108 of FIG. 4*a*.

In general, application interface module 904 may be arranged to communicate with the host, operating system or the user directly. Application interface module 904 is also in communication with system manager module 908 and data manager module 912. When the user wants to read, write or format a flash memory, the user sends requests to the operating system, the requests are passed to the application interface module 904. Application interface module 904 directs the requests to system manager module 908 or data manager module 912 depending on the requests.

System manager module 908 includes a system initialization submodule 924, an erase count block management submodule 926, and a power management block submodule 930. System initialization submodule 924 is generally arranged to enable an initialization request to be processed, and typically communicates with erase count block management submodule 926. Erase count block management submodule 926 includes functionality to cause erase counts of blocks to be stored, and functionality to cause an average erase count to be calculated, as well as updated, using individual erase counts. The use of erase counts is described in co-pending U.S. patent application Ser. No. 10/281,739, filed Oct. 28, 2002, which is incorporated herein by reference in its entirety.

In addition to being in communication with application interface module 904, system manager module 908 is also in communication with data manager module 812, as well as device manager and interface module 920. Data manager module 912, which communicates with both system manager module 908 and application interface module 904, may include functionality to provide sector mapping which effectively translates logical sectors into physical sectors. That is, data manager module 912 is arranged to map logical blocks into physical blocks. Data manager module 912 may also include functionality associated with operating system and file system interface layers, and enables groups within blocks to be managed.

Device manager and interface module 920, which is in communication with system manager module 908, data manager 912, and data integrity manager 916, typically provides a flash memory interface, and includes functionality associated with hardware abstractions, e.g., an I/O interface. Data integrity manager module 916 provides ECC handling, among other functions.

Although only a few embodiments of the present invention have been described, it should be understood that the present invention may be embodied in many other specific forms without departing from the spirit or the scope of the present invention. By way of example, while logical groups within logical blocks and corresponding physical groups within physical blocks have been described as being substantially the same size, logical groups and physical groups may generally be of different sizes. In other words, the number of pages included in a logical group and the number of pages included in a physical group that corresponds to the logical group may not necessarily be the same.

The steps associated with the various methods of the present invention may be widely varied. In general, steps may be added, removed, reordered, and altered. Therefore, the present examples are to be considered as illustrative and not restrictive, and the invention is not to be limited to the details given herein, but may be modified within the scope of the appended claims.

What is claimed is:

1. A memory system comprising:
a non-volatile memory, the non-volatile memory including a first physical block, the first physical block including a plurality of physical pages, the plurality of physical pages being grouped into a plurality of physical groups, wherein each physical group of the plurality of physical group includes two or more physical pages;
code devices for mapping a first logical block to the first physical block, the first logical block corresponding to a plurality of logical pages grouped into a plurality of logical groups, each logical group of the plurality of logical groups including two or more logical pages;
code devices for writing input data into a first physical page included in a first physical group of the first physical block responsive to the input data being associated with a first logical page in a first logical group of the first logical block;
wherein the code devices for writing input data are also for writing input data into a first physical page included in a second physical group responsive to then receiving input data associated with a first logical page in a second logical group of the first logical block, and for writing input data into a second physical page in a third physical group of the first physical block responsive to then receiving input data associated with a second logical page in the first logical group;
and further comprising:
code devices for retrieving data from the second physical page in the third physical group and the first physical page in the first physical group responsive to a read command requesting retrieval of data from the first logical group.

2. The memory system of claim 1 wherein the first physical group is identified by a group identifier, the group identifier being stored in a redundant area associated with each physical page in the first physical group,
and wherein the code devices for retrieving comprise:
code devices for obtaining the group identifier from the first and second physical pages of the first physical group; and
code devices for reading data from the first and second physical pages responsive to the group identifiers of the first and second physical pages matching a mapping to the first logical block.

3. The memory system of claim 1 further including:
a memory for storing the code devices; and
a processor for processing the code devices.

4. The memory system of claim 1 wherein the non-volatile memory is a flash memory.

5. The memory system of claim 4 wherein the flash memory is a NAND flash memory.

6. The memory system of claim 1 wherein the code devices are software code devices.

7. The memory system of claim 1 wherein the code devices are firmware code devices.

8. A memory system, comprising:
a non-volatile memory, the non-volatile memory including a first block, the first block including a plurality of pages, the plurality of pages being grouped into a plurality of groups within the first block, wherein each group of the plurality of groups includes two or more pages;
code devices for determining whether a first group of the plurality of groups within the first block is available to receive a set of data;
code devices for writing the set of data into a first page included in the first group responsive to the code devices determining that the first group is available to receive the set of data;
code devices for determining whether a second group of the plurality of groups within the first block is available to receive the set of data responsive to the code devices determining that the first group is not available to receive the set of data;
code devices for writing the set of data into a second page included in the second group responsive to the code devices determining that the second group is available to receive the set of data;
code devices for determining whether a second block is available to receive the set of data when it is determined that the second group is not available to receive the set of data, the second block being included in the non-volatile memory;
code devices for copying contents of some of the plurality of pages into the second block responsive to the code devices determining that the second block is available to receive the set of data; and
code devices for writing the set of data into the second block responsive to the code devices determining that the second block is available to receive the set of data.

9. The memory system of claim 8 further including:
code devices for determining the first group; and
code devices for determining the second group.

10. The memory system of claim 8 where the code devices for determining whether the first group is available to receive the set of data include code devices for determining whether the first page is appropriate to receive the set of data.

11. The memory system of claim 8 wherein the data is associated with a logical page, and the first block is a first physical block.

12. A method for writing data into a first physical block of a non-volatile memory, the first physical block including a plurality of physical pages, the plurality of physical pages being grouped into a plurality of physical groups, wherein each physical group of the plurality of physical groups includes two or more physical pages, the method comprising:
mapping a first logical block to the first physical block, the first logical block arranged as a plurality of logical pages grouped into a plurality of logical groups, each logical group of the plurality of logical groups including two or more logical pages;
responsive to receiving input data associated with a first logical page in a first logical group of the first logical block, writing the input data into a first physical page included in a first physical group of the first physical block;
responsive to receiving input data associated with a first logical page in a second logical group of the first logical block, writing the input data into a first physical page included in a second physical group;
then, responsive to receiving input data associated with a second logical page in the first logical group of the first logical block, writing the input data into a second physical page included in a third physical group of the first physical block; and
then, responsive to a read command requesting retrieval of data from the first logical group, retrieving data from the second physical page in the third physical group and the first physical page in the first physical group.

13. The method of claim 12 wherein the first and second physical pages in the first and third physical groups are identified by a group identifier, the group identifier being stored in a redundant area associated with the first and second physical pages.

14. The method of claim 13 wherein the retrieving step comprises:
   obtaining group identifiers from the first and second physical pages; and
   responsive to the group identifiers of the first and second physical pages matching a mapping to the first logical block, retrieving data from the first and second physical pages.

15. A method for writing data into a first physical block associated with a non-volatile memory, the first physical block including a plurality of physical pages, the plurality of physical pages being grouped into a plurality of physical groups, wherein each physical group of the plurality of physical groups includes two or more physical pages, the method comprising:
   identifying a first set of data associated with a first logical page, the first logical page being one of a plurality of logical pages included in a first logical group of a logical block;
   determining whether a first physical group of the plurality of physical groups is associated with the first logical group;
   determining whether a first physical page included in the first physical group is available to accommodate the first set of data responsive to determining that the first physical group is associated with the first logical group; and
   writing the first set of data into the first physical page responsive to determining that the first physical page is available to accommodate the first set of data;
   determining whether the first physical group is available responsive to determining that the first physical group is not associated with the first logical group;
   associating the first physical group with the first logical group responsive to determining that the first physical group is available; and
   writing the first set of data into a second physical page associated with the first physical group.

16. The method of claim 15 further including:
   identifying a second set of data associated with the first logical group; and
   writing the second set of data into a third physical page associated with the first physical group.

17. The method of claim 16 further including:
   determining whether the third physical page is available to accommodate the second set of data, wherein the second set of data is written into the third physical page responsive to determining that the third physical page is available to accommodate the second set of data.

18. A method for writing data into a first physical block associated with a non-volatile memory, the first physical block including a plurality of physical pages, the plurality of physical pages being grouped into a plurality of physical groups within the first physical block, wherein each physical group of the plurality of physical groups includes two or more physical pages, the method comprising:
   associating a first set of data with a first logical page, the first logical page being one of a plurality of logical pages included in a first logical group of a logical block;
   identifying a first physical group of the plurality of physical groups within the first physical block that is associated with the first logical group;
   then determining whether a first physical page included in the first physical group is available to accommodate the first set of data;
   writing the first set of data into the first physical page responsive to determining that the first physical page is available to accommodate the first set of data;
   determining whether a second physical group included in the plurality of physical groups within the first physical block is available responsive to determining that the first physical page is not available to accommodate the first set of data; and
   then writing the first set of data into a second physical page associated with the second physical group.

19. The method of claim 18 further including:
   associating the second physical group with the first logical group responsive to determining that the second physical group is available.

20. A method for writing data into a first physical block associated with a non-volatile memory, the first physical block including a plurality of physical pages, the plurality of physical pages being grouped into a plurality of physical groups, wherein each physical group of the plurality of physical groups includes two or more physical pages, the method comprising:
   identifying a first set of data associated with a first logical page, the first logical page being one of a plurality of logical pages included in a first logical group of a logical block;
   determining whether a first physical group of the plurality of physical groups is associated with the first logical group;
   determining whether a first physical page included in the first physical group is available to accommodate the first set of data responsive to determining that the first physical group is associated with the first logical group; and
   writing the first set of data into the first physical page responsive to determining that the first physical page is available to accommodate the first set of data;
   determining whether a second physical group included in the plurality of physical groups is available responsive to determining that the first physical page is not available to accommodate the first set of data; and
   writing the first set of data into a second physical page associated with the second physical group;
   wherein, responsive to determining that the second physical block is available, the method further includes:
   determining whether a second physical block associated with the non-volatile memory is available to accommodate the first set of data responsive to determining that the second physical group is not available;
   copying some of the contents of the plurality of physical pages included in the first physical block into physical pages included in the second physical block; and
   writing the first set of data into a third physical page associated with the second physical block.

21. The method of claim 20 further including:
   erasing the first physical block.

22. The method of claim 20 wherein the third physical page associated with the second physical block is a part of a third physical group included in the second physical block, the third physical group including two or more physical pages.

23. The method of claim 22 further including:
associating the third physical group with the first logical group.

24. A memory system comprising:
a non-volatile memory, the non-volatile memory including a first physical block having a plurality of physical pages, the plurality of physical pages being grouped into a plurality of physical groups, wherein each physical group of the plurality of physical groups includes two or more physical pages; and
a module, the module being arranged to identify a first set of data associated with a first logical page, the first logical page being one of a plurality of logical pages included in a first logical group of a logical block, the module further being arranged to determine whether a first physical group of the plurality of physical groups is associated with the first logical group, to determine whether a first physical page included in the first physical group is available to accommodate the first set of data responsive to determining that the first physical group is associated with the first logical group, and to write the first set of data into the first physical page responsive to determining that the first physical page is available to accommodate the first set of data;
wherein the module is still further arranged to determine whether the first physical group is available responsive to determining that the first physical group is not associated with the first logical group, to associate the first physical group with the first logical group responsive to determining that the first physical group is available, and to write the first set of data into a second physical page associated with the first physical group.

25. The memory system of claim 24 wherein the module is still further arranged to identify a second set of data associated with the first logical group, and
to write the second set of data into a third physical page associated with the first physical group.

26. The memory system of claim 25 wherein the module is still further arranged to determine whether the third physical page is available to accommodate the second set of data, wherein the second set of data is written into the third physical page it is determined responsive to determining that the third physical page is available to accommodate the second set of data.

27. The memory system of claim 24 wherein the module is arranged to determine whether the first physical group is associated with the first logical group includes by obtaining a group identifier from the first physical group, wherein the group identifier is arranged to identify the first physical group, and determining whether the group identifier is associated with the first logical group.

28. The memory system of claim 24 wherein the non-volatile memory is a NAND flash memory.

29. A memory system comprising:
a non-volatile memory, the non-volatile memory including a first physical block having a plurality of physical pages, the plurality of physical pages being grouped into a plurality of physical groups, wherein each physical group of the plurality of physical groups includes two or more physical pages; and
a module, the module being arranged to identify a first set of data associated with a first logical page, the first logical page being one of a plurality of logical pages included in a first logical group of a logical block, the module further being arranged to determine whether a first physical group of the plurality of physical groups is associated with the first logical group, to determine whether a first physical page included in the first physical group is available to accommodate the first set of data responsive to determining that the first physical group is associated with the first logical group, and to write the first set of data into the first physical page responsive to determining that the first physical page is available to accommodate the first set of data;
wherein the module is still further arranged to determine whether a second physical group included in the plurality of physical groups is available responsive to determining that the first physical page is not available to accommodate the first set of data, to associate the second physical group with the first logical group responsive to determining that the second physical group is available, and to write the first set of data into a second physical page associated with the second physical group;
and further including:
a second physical block, wherein the module is still further arranged to determine when the second physical block associated with the non-volatile memory is available to accommodate the first set of data responsive to determining that the second physical group is not available, and to copy some of the contents of the plurality of physical pages included in the first physical block into physical pages included in the second physical block responsive to determining that the second physical block is available, and to write the first set of data into a third physical page associated with the second physical block responsive to determining that the second physical block is available.

30. The memory system of claim 29 wherein the module is still further arranged to erase the first physical block.

31. A system for writing data into a first physical block of a non-volatile memory, the first physical block including a plurality of physical pages, the plurality of physical pages being grouped into a plurality of physical groups, wherein each physical group of the plurality of physical groups includes two or more physical pages, the system comprising:
means for mapping a first logical block to the first physical block, the first logical block corresponding to a plurality of logical pages grouped into a plurality of logical groups, each logical group of the plurality of logical groups including two or more logical pages;
means for writing input data into a first physical page included in a first physical group of the first physical block responsive to the input data being associated with a first logical page in a first logical group of the first logical block;
wherein the writing means is also for writing input data into a first physical page included in a second physical group responsive to then receiving input data associated with a first logical page in a second logical group of the first logical block, and for writing input data into a second physical page in a third physical group of the first physical block responsive to then receiving input data associated with a second logical page in the first logical group;
and further comprising:
means for retrieving data from the second physical page in the third physical group and the first physical page in the first physical group responsive to a read command requesting retrieval of data from the first logical group.

32. The system of claim 31 wherein the means for retrieving comprises:
means for obtaining a group identifier from the first and second physical pages; and
means for reading data from the first and second physical pages responsive to the group identifiers of the first and second physical pages matching a mapping to the first logical block.

33. A system for writing data into a first physical block associated with a non-volatile memory, the first physical block including a plurality of physical pages, the plurality of physical pages being grouped into a plurality of physical groups, wherein each physical group of the plurality of physical groups includes two or more physical pages, the system comprising:
means for identifying a first set of data associated with a first logical page, the first logical page being one of a plurality of logical pages included in a first logical group of a logical block;
means for determining whether a first physical group of the plurality of physical groups is associated with the first logical group;
means for determining whether a first physical page included in the first physical group is available to accommodate the first set of data responsive to determining that the first physical group is associated with the first logical group;
means for writing the first set of data into the first physical page responsive to determining that the first physical page is available to accommodate the first set of data;
means for determining whether the first physical group is available responsive to determining that the first physical group is not associated with the first logical group;
means for associating the first physical group with the first logical group responsive to determining that the first physical group is available; and
means for writing the first set of data into a second physical page associated with the first physical group.

34. The system of claim 33 further including:
means for identifying a second set of data associated with the first logical group;
means for writing the second set of data into a third physical page associated with the first physical group;
means for determining whether the third physical page is available to accommodate the second set of data, wherein the second set of data is written into the third physical page responsive to determining that the third physical page is available to accommodate the second set of data.

35. A system for writing data into a first physical block associated with a non-volatile memory, the first physical block including a plurality of physical pages, the plurality of physical pages being grouped into a plurality of physical groups within the first physical block, wherein each physical group of the plurality of physical groups includes two or more physical pages, the system comprising:
means for identifying a first set of data associated with a first logical page, the first logical page being one of a plurality of logical pages included in a first logical group of a logical block;
means for associating a first physical group of the plurality of physical groups within the first physical block with the first logical group;
means for determining whether a first physical page included in the first physical group within the first physical block is available to accommodate the first set of data p;
means for writing the first set of data into the first physical page responsive to the determining means determining that the first physical page is available to accommodate the first set of data;
means for determining whether a second physical group included in the plurality of physical groups within the first physical block is available responsive to the determining means determining that the first physical page is not available to accommodate the first set of data; and
means for writing the first set of data into a second physical page associated with the second physical group.

36. The system of claim 35 further including:
means for associating the second physical group with the first logical group responsive to determining that that the second physical group is available.

37. The system of claim 35 further including:
means for determining when a second physical block associated with the non-volatile memory is available to accommodate the first set of data responsive to determining that that the second physical group is not available.

38. The system of claim 37 further including:
means for copying some of the contents of the plurality of physical pages included in the first physical block into physical pages included in the second physical block responsive to determining that that the second physical block is available; and
means for writing the first set of data into a third physical page associated with the second physical block when it is determined that the second physical block is available.

39. The system of claim 38 further including:
means for erasing the first physical block.

40. The system of claim 38 wherein the third physical page associated with the second physical block is a part of a third physical group included in the second physical block, the third physical group including two or more physical pages.

41. The system of claim 40 further including:
means for associating the third physical group with the first logical group.

* * * * *